United States Patent
Zeldis et al.

(10) Patent No.: US 10,019,138 B2
(45) Date of Patent: *Jul. 10, 2018

(54) APPLYING A GUI DISPLAY EFFECT FORMULA IN A HIDDEN COLUMN TO A SECTION OF DATA

(71) Applicant: Walleye Software, LLC, Plymouth, MN (US)

(72) Inventors: Mark Zeldis, Randolph, NJ (US); Ryan Caudy, New York, NY (US); David R. Kent, IV, Colorado Springs, CO (US); Charles Wright, Cortlandt Manor, NY (US); Radu Teodorescu, New York, NY (US); Nathaniel J. Dorfman, Sandy, UT (US)

(73) Assignee: Illumon LLC, Plymouth, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/428,145

(22) Filed: Feb. 8, 2017

(65) Prior Publication Data

US 2017/0249066 A1      Aug. 31, 2017

Related U.S. Application Data

(63) Continuation of application No. 15/155,007, filed on May 14, 2016, now Pat. No. 9,613,018.

(60) Provisional application No. 62/161,813, filed on May 14, 2015.

(51) Int. Cl.
*G06F 17/00* (2006.01)
*G06F 3/0483* (2013.01)
*G06F 17/30* (2006.01)
*G06F 3/0485* (2013.01)

(52) U.S. Cl.
CPC .......... *G06F 3/0483* (2013.01); *G06F 3/0485* (2013.01); *G06F 17/30864* (2013.01)

(58) Field of Classification Search
None
See application file for complete search history.

(56) References Cited

U.S. PATENT DOCUMENTS

| | | | |
|---|---|---|---|
| 5,335,202 | A | 8/1994 | Manning et al. |
| 5,452,434 | A | 9/1995 | Macdonald |
| 5,469,567 | A | 11/1995 | Okada |
| 5,504,885 | A | 4/1996 | Alashqur |
| 5,530,939 | A | 6/1996 | Mansfield et al. |
| 5,568,632 | A | 10/1996 | Nelson |
| 5,673,369 | A | 9/1997 | Kim |
| 5,701,461 | A | 12/1997 | Dalal et al. |

(Continued)

FOREIGN PATENT DOCUMENTS

| | | |
|---|---|---|
| CA | 2309462 A1 | 12/2000 |
| EP | 1406463 A2 | 4/2004 |

(Continued)

OTHER PUBLICATIONS

"About Entering Commands in the Command Window", dated Dec. 16, 2015. Retrieved from https://knowledge.autodesk.com/support/autocad/learn-explore/caas/CloudHelp/cloudhelp/2016/ENU/AutoCAD-Core/files/GUID-BB0C3E79-66AF-4557-9140-D31B4CF3C9CF-htm.html (last accessed Jun. 16, 2016).

(Continued)

*Primary Examiner* — Asher D Kells
(74) *Attorney, Agent, or Firm* — Carmichael IP, PLLC

(57) ABSTRACT

Described are methods, systems and computer readable media for GUI display effect formatting.

20 Claims, 13 Drawing Sheets

(56) References Cited

U.S. PATENT DOCUMENTS

| | | |
|---|---|---|
| 5,701,467 A | 12/1997 | Freeston |
| 5,764,953 A | 6/1998 | Collins et al. |
| 5,787,428 A | 7/1998 | Hart |
| 5,806,059 A | 9/1998 | Tsuchida et al. |
| 5,859,972 A | 1/1999 | Subramaniam et al. |
| 5,875,334 A | 2/1999 | Chow et al. |
| 5,878,415 A | 3/1999 | Olds |
| 5,890,167 A | 3/1999 | Bridge et al. |
| 5,899,990 A | 5/1999 | Maritzen et al. |
| 5,920,860 A | 7/1999 | Maheshwari et al. |
| 5,943,672 A | 8/1999 | Yoshida |
| 5,960,087 A | 9/1999 | Tribble et al. |
| 5,991,810 A | 11/1999 | Shapiro et al. |
| 5,999,918 A | 12/1999 | Williams et al. |
| 6,006,220 A | 12/1999 | Haderle et al. |
| 6,032,144 A | 2/2000 | Srivastava et al. |
| 6,032,148 A | 2/2000 | Wilkes |
| 6,038,563 A | 3/2000 | Bapat et al. |
| 6,058,394 A | 5/2000 | Bakow et al. |
| 6,061,684 A | 5/2000 | Glasser et al. |
| 6,138,112 A | 10/2000 | Slutz |
| 6,266,669 B1 | 7/2001 | Brodersen et al. |
| 6,289,357 B1 | 9/2001 | Parker |
| 6,292,803 B1 | 9/2001 | Richardson et al. |
| 6,304,876 B1 | 10/2001 | Isip |
| 6,317,728 B1 | 11/2001 | Kane |
| 6,327,702 B1 | 12/2001 | Sauntry et al. |
| 6,336,114 B1 | 1/2002 | Garrison |
| 6,353,819 B1 | 3/2002 | Edwards et al. |
| 6,367,068 B1 | 4/2002 | Vaidyanathan et al. |
| 6,389,414 B1 | 5/2002 | Delo et al. |
| 6,389,462 B1 | 5/2002 | Cohen et al. |
| 6,438,537 B1 | 8/2002 | Netz et al. |
| 6,446,069 B1 | 9/2002 | Yaung et al. |
| 6,460,037 B1 | 10/2002 | Weiss et al. |
| 6,473,750 B1 | 10/2002 | Petculescu et al. |
| 6,487,552 B1 | 11/2002 | Lei et al. |
| 6,496,833 B1 | 12/2002 | Goldberg et al. |
| 6,505,189 B1 | 1/2003 | Au et al. |
| 6,505,241 B2 | 1/2003 | Pitts |
| 6,510,551 B1 | 1/2003 | Miller |
| 6,530,075 B1 | 3/2003 | Beadle et al. |
| 6,538,651 B1 | 3/2003 | Hayman et al. |
| 6,546,402 B1 | 4/2003 | Beyer et al. |
| 6,553,375 B1 | 4/2003 | Huang et al. |
| 6,584,474 B1 | 6/2003 | Pereira |
| 6,604,104 B1 | 8/2003 | Smith |
| 6,618,720 B1 | 9/2003 | Au et al. |
| 6,631,374 B1 | 10/2003 | Klein et al. |
| 6,640,234 B1 | 10/2003 | Coffen et al. |
| 6,697,880 B1 | 2/2004 | Dougherty |
| 6,701,415 B1 | 3/2004 | Hendren |
| 6,714,962 B1 | 3/2004 | Helland et al. |
| 6,725,243 B2 | 4/2004 | Snapp |
| 6,732,100 B1 | 5/2004 | Brodersen et al. |
| 6,745,332 B1 | 6/2004 | Wong et al. |
| 6,748,374 B1 | 6/2004 | Madan et al. |
| 6,748,455 B1 | 6/2004 | Hinson et al. |
| 6,760,719 B1 | 7/2004 | Hanson et al. |
| 6,775,660 B2 | 8/2004 | Lin et al. |
| 6,785,668 B1 | 8/2004 | Polo et al. |
| 6,795,851 B1 | 9/2004 | Noy |
| 6,816,855 B2 | 11/2004 | Hartel et al. |
| 6,820,082 B1 | 11/2004 | Cook et al. |
| 6,829,620 B2 | 12/2004 | Michael et al. |
| 6,832,229 B2 | 12/2004 | Reed |
| 6,851,088 B1 | 2/2005 | Conner et al. |
| 6,882,994 B2 | 4/2005 | Yoshimura et al. |
| 6,925,472 B2 | 8/2005 | Kong |
| 6,934,717 B1 | 8/2005 | James |
| 6,947,928 B2 | 9/2005 | Dettinger et al. |
| 6,983,291 B1 | 1/2006 | Cochrane et al. |
| 6,985,895 B2 | 1/2006 | Witkowski et al. |
| 6,985,899 B2 | 1/2006 | Chan et al. |
| 6,985,904 B1 | 1/2006 | Kaluskar et al. |
| 7,020,649 B2 | 3/2006 | Cochrane et al. |
| 7,024,414 B2 | 4/2006 | Sah et al. |
| 7,031,962 B2 | 4/2006 | Moses |
| 7,058,657 B1 | 6/2006 | Berno |
| 7,089,228 B2 | 8/2006 | Arnold et al. |
| 7,089,245 B1 | 8/2006 | George et al. |
| 7,096,216 B2 | 8/2006 | Anonsen |
| 7,103,608 B1 | 9/2006 | Ozbutun et al. |
| 7,110,997 B1 | 9/2006 | Turkel et al. |
| 7,127,462 B2 | 10/2006 | Hiraga et al. |
| 7,146,357 B2 | 12/2006 | Suzuki et al. |
| 7,149,742 B1 | 12/2006 | Eastham et al. |
| 7,167,870 B2 | 1/2007 | Avvari et al. |
| 7,171,469 B2 | 1/2007 | Ackaouy et al. |
| 7,174,341 B2 | 2/2007 | Ghukasyan et al. |
| 7,181,686 B1 | 2/2007 | Bahrs |
| 7,188,105 B2 | 3/2007 | Dettinger et al. |
| 7,200,620 B2 | 4/2007 | Gupta |
| 7,216,115 B1 | 5/2007 | Walters et al. |
| 7,216,116 B1 | 5/2007 | Nilsson et al. |
| 7,219,302 B1 | 5/2007 | O'Shaughnessy et al. |
| 7,225,189 B1 | 5/2007 | McCormack et al. |
| 7,254,808 B2 | 8/2007 | Trappen et al. |
| 7,257,689 B1 | 8/2007 | Baird |
| 7,272,605 B1 | 9/2007 | Hinshaw et al. |
| 7,308,580 B2 | 12/2007 | Nelson et al. |
| 7,316,003 B1 | 1/2008 | Dulepet et al. |
| 7,330,969 B2 | 2/2008 | Harrison et al. |
| 7,333,941 B1 | 2/2008 | Choi |
| 7,343,585 B1 | 3/2008 | Lau et al. |
| 7,350,237 B2 | 3/2008 | Vogel et al. |
| 7,380,242 B2 | 5/2008 | Alaluf |
| 7,401,088 B2 | 7/2008 | Chintakayala et al. |
| 7,426,521 B2 | 9/2008 | Harter |
| 7,430,549 B2 | 9/2008 | Zane et al. |
| 7,433,863 B2 | 10/2008 | Zane et al. |
| 7,447,865 B2 | 11/2008 | Uppala et al. |
| 7,478,094 B2 | 1/2009 | Ho et al. |
| 7,484,096 B1 | 1/2009 | Garg et al. |
| 7,493,311 B1 | 2/2009 | Cutsinger et al. |
| 7,529,734 B2 | 5/2009 | Dirisala |
| 7,529,750 B2 | 5/2009 | Bair |
| 7,542,958 B1 | 6/2009 | Warren et al. |
| 7,610,351 B1 | 10/2009 | Gollapudi et al. |
| 7,620,687 B2 | 11/2009 | Chen et al. |
| 7,624,126 B2 | 11/2009 | Pizzo et al. |
| 7,627,603 B2 | 12/2009 | Rosenblum et al. |
| 7,661,141 B2 | 2/2010 | Dutta et al. |
| 7,664,778 B2 | 2/2010 | Yagoub et al. |
| 7,672,275 B2 | 3/2010 | Yajnik et al. |
| 7,680,782 B2 | 3/2010 | Chen et al. |
| 7,711,716 B2 | 5/2010 | Stonecipher |
| 7,711,740 B2 | 5/2010 | Minore et al. |
| 7,761,444 B2 | 7/2010 | Zhang et al. |
| 7,797,356 B2 | 9/2010 | Iyer et al. |
| 7,827,204 B2 | 11/2010 | Heinzel et al. |
| 7,827,403 B2 | 11/2010 | Wong et al. |
| 7,827,523 B2 | 11/2010 | Ahmed et al. |
| 7,882,121 B2 | 2/2011 | Bruno et al. |
| 7,882,132 B2 | 2/2011 | Ghatare |
| 7,904,487 B2 | 3/2011 | Ghatare |
| 7,908,259 B2 | 3/2011 | Branscome et al. |
| 7,908,266 B2 | 3/2011 | Zeringue et al. |
| 7,930,412 B2 | 4/2011 | Yeap et al. |
| 7,966,311 B2 | 6/2011 | Haase |
| 7,966,312 B2 | 6/2011 | Nolan et al. |
| 7,966,343 B2 | 6/2011 | Yang et al. |
| 7,970,777 B2 | 6/2011 | Saxena et al. |
| 7,979,431 B2 | 7/2011 | Qazi et al. |
| 7,984,043 B1 | 7/2011 | Waas |
| 8,019,795 B2 | 9/2011 | Anderson et al. |
| 8,027,293 B2 | 9/2011 | Spaur et al. |
| 8,032,525 B2 | 10/2011 | Bowers et al. |
| 8,037,542 B2 | 10/2011 | Taylor et al. |
| 8,046,394 B1 | 10/2011 | Shatdal |
| 8,046,749 B1 | 10/2011 | Owen et al. |
| 8,055,672 B2 | 11/2011 | Djugash et al. |
| 8,060,484 B2 | 11/2011 | Bandera et al. |
| 8,171,018 B2 | 5/2012 | Zane et al. |

(56) References Cited

U.S. PATENT DOCUMENTS

| | | |
|---|---|---|
| 8,180,789 B1 | 5/2012 | Wasserman et al. |
| 8,196,121 B2 | 6/2012 | Peshansky et al. |
| 8,209,356 B1 | 6/2012 | Roesler |
| 8,286,189 B2 | 10/2012 | Kukreja et al. |
| 8,321,833 B2 | 11/2012 | Langworthy et al. |
| 8,332,435 B2 | 12/2012 | Ballard et al. |
| 8,359,305 B1 | 1/2013 | Burke et al. |
| 8,375,127 B1 | 2/2013 | Lita |
| 8,380,757 B1 | 2/2013 | Bailey et al. |
| 8,418,142 B2 | 4/2013 | Ao et al. |
| 8,433,701 B2 | 4/2013 | Sargeant et al. |
| 8,458,218 B2 | 6/2013 | Wildermuth |
| 8,473,897 B2 | 6/2013 | Box et al. |
| 8,478,713 B2 | 7/2013 | Cotner et al. |
| 8,515,942 B2 | 8/2013 | Marum et al. |
| 8,543,620 B2 | 9/2013 | Ching |
| 8,553,028 B1 | 10/2013 | Urbach |
| 8,555,263 B2 | 10/2013 | Allen et al. |
| 8,560,502 B2 | 10/2013 | Vora |
| 8,595,151 B2 | 11/2013 | Hao et al. |
| 8,601,016 B2 | 12/2013 | Briggs et al. |
| 8,631,034 B1 | 1/2014 | Peloski |
| 8,650,182 B2 | 2/2014 | Murthy |
| 8,660,869 B2 | 2/2014 | Macintyre et al. |
| 8,676,863 B1 | 3/2014 | Connell et al. |
| 8,683,488 B2 | 3/2014 | Kukreja et al. |
| 8,713,518 B2 | 4/2014 | Pointer et al. |
| 8,719,252 B2 | 5/2014 | Miranker et al. |
| 8,725,707 B2 | 5/2014 | Chen et al. |
| 8,726,254 B2 | 5/2014 | Rohde et al. |
| 8,745,014 B2 | 6/2014 | Travis |
| 8,745,510 B2 | 6/2014 | D'Alo' et al. |
| 8,751,823 B2 | 6/2014 | Myles et al. |
| 8,768,961 B2 | 7/2014 | Krishnamurthy |
| 8,788,254 B2 | 7/2014 | Peloski |
| 8,793,243 B2 | 7/2014 | Weyerhaeuser et al. |
| 8,805,947 B1 | 8/2014 | Kuzkin et al. |
| 8,806,133 B2 | 8/2014 | Hay et al. |
| 8,812,625 B1 | 8/2014 | Chitilian et al. |
| 8,838,656 B1 | 9/2014 | Cheriton |
| 8,855,999 B1 | 10/2014 | Elliot |
| 8,863,156 B1 | 10/2014 | Lepanto et al. |
| 8,874,512 B2 | 10/2014 | Jin et al. |
| 8,880,569 B2 | 11/2014 | Draper et al. |
| 8,880,787 B1 | 11/2014 | Kimmel et al. |
| 8,881,121 B2 | 11/2014 | Ali |
| 8,886,631 B2 | 11/2014 | Abadi et al. |
| 8,903,717 B2 | 12/2014 | Elliot |
| 8,903,842 B2 | 12/2014 | Bloesch et al. |
| 8,922,579 B2 | 12/2014 | Mi et al. |
| 8,924,384 B2 | 12/2014 | Driesen et al. |
| 8,930,892 B2 | 1/2015 | Pointer et al. |
| 8,954,418 B2 | 2/2015 | Faerber et al. |
| 8,959,495 B2 | 2/2015 | Chafi et al. |
| 8,996,864 B2 | 3/2015 | Maigne et al. |
| 9,031,930 B2 | 5/2015 | Valentin |
| 9,077,611 B2 | 7/2015 | Cordray et al. |
| 9,122,765 B1 | 9/2015 | Chen |
| 9,195,712 B2 | 11/2015 | Freedman et al. |
| 9,298,768 B2 | 3/2016 | Varakin et al. |
| 9,311,357 B2 | 4/2016 | Ramesh et al. |
| 9,372,671 B2 | 6/2016 | Balan et al. |
| 9,384,184 B2 | 7/2016 | Cervantes et al. |
| 9,633,060 B2 | 4/2017 | Caudy et al. |
| 9,679,006 B2 | 6/2017 | Wright et al. |
| 9,805,084 B2 | 10/2017 | Wright et al. |
| 9,832,068 B2 | 11/2017 | McSherry et al. |
| 2002/0002576 A1 | 1/2002 | Wollrath et al. |
| 2002/0007331 A1 | 1/2002 | Lo et al. |
| 2002/0054587 A1 | 5/2002 | Baker et al. |
| 2002/0065981 A1 | 5/2002 | Jenne et al. |
| 2002/0156722 A1 | 10/2002 | Greenwood |
| 2003/0004952 A1 | 1/2003 | Nixon et al. |
| 2003/0061216 A1 | 3/2003 | Moses |
| 2003/0074400 A1 | 4/2003 | Brooks et al. |
| 2003/0110416 A1 | 6/2003 | Morrison et al. |
| 2003/0167261 A1 | 9/2003 | Grust et al. |
| 2003/0182261 A1 | 9/2003 | Patterson |
| 2003/0208484 A1 | 11/2003 | Chang et al. |
| 2003/0208505 A1 | 11/2003 | Mullins et al. |
| 2003/0233632 A1 | 12/2003 | Aigen et al. |
| 2004/0002961 A1 | 1/2004 | Dettinger et al. |
| 2004/0076155 A1 | 4/2004 | Yajnik et al. |
| 2004/0111492 A1 | 6/2004 | Nakahara et al. |
| 2004/0148630 A1 | 7/2004 | Choi |
| 2004/0186813 A1 | 9/2004 | Tedesco et al. |
| 2004/0216150 A1 | 10/2004 | Scheifler et al. |
| 2004/0220923 A1 | 11/2004 | Nica |
| 2004/0254876 A1 | 12/2004 | Coval et al. |
| 2005/0015490 A1 | 1/2005 | Saare et al. |
| 2005/0060693 A1 | 3/2005 | Robison et al. |
| 2005/0097447 A1 | 5/2005 | Serra et al. |
| 2005/0102284 A1 | 5/2005 | Srinivasan et al. |
| 2005/0102636 A1 | 5/2005 | McKeon et al. |
| 2005/0131893 A1 | 6/2005 | Glan |
| 2005/0132384 A1 | 6/2005 | Morrison et al. |
| 2005/0138624 A1 | 6/2005 | Morrison et al. |
| 2005/0165866 A1 | 7/2005 | Bohannon et al. |
| 2005/0198001 A1 | 9/2005 | Cunningham et al. |
| 2006/0059253 A1 | 3/2006 | Goodman et al. |
| 2006/0074901 A1 | 4/2006 | Pirahesh et al. |
| 2006/0085490 A1 | 4/2006 | Baron et al. |
| 2006/0100989 A1 | 5/2006 | Chinchwadkar et al. |
| 2006/0101019 A1 | 5/2006 | Nelson et al. |
| 2006/0116983 A1 | 6/2006 | Dettinger et al. |
| 2006/0116999 A1 | 6/2006 | Dettinger et al. |
| 2006/0136361 A1 | 6/2006 | Peri et al. |
| 2006/0173693 A1 | 8/2006 | Arazi et al. |
| 2006/0195460 A1 | 8/2006 | Nori et al. |
| 2006/0212847 A1 | 9/2006 | Tarditi et al. |
| 2006/0218123 A1 | 9/2006 | Chowdhuri et al. |
| 2006/0218200 A1 | 9/2006 | Factor et al. |
| 2006/0230016 A1 | 10/2006 | Cunningham et al. |
| 2006/0253311 A1 | 11/2006 | Yin et al. |
| 2006/0271510 A1 | 11/2006 | Harvard et al. |
| 2006/0277162 A1 | 12/2006 | Smith |
| 2007/0011211 A1 | 1/2007 | Reeves et al. |
| 2007/0027884 A1 | 2/2007 | Heger et al. |
| 2007/0033518 A1 | 2/2007 | Kenna et al. |
| 2007/0073765 A1 | 3/2007 | Chen |
| 2007/0101252 A1 | 5/2007 | Chamberlain et al. |
| 2007/0169003 A1 | 7/2007 | Branda et al. |
| 2007/0256060 A1 | 11/2007 | Ryu et al. |
| 2007/0258508 A1 | 11/2007 | Werb et al. |
| 2007/0271280 A1 | 11/2007 | Chandasekaran |
| 2007/0299822 A1 | 12/2007 | Jopp et al. |
| 2008/0022136 A1 | 1/2008 | Mattsson et al. |
| 2008/0033907 A1 | 2/2008 | Woehler et al. |
| 2008/0046804 A1 | 2/2008 | Rui et al. |
| 2008/0072150 A1 | 3/2008 | Chan et al. |
| 2008/0120283 A1 | 5/2008 | Liu et al. |
| 2008/0155565 A1 | 6/2008 | Poduri |
| 2008/0168135 A1 | 7/2008 | Redlich et al. |
| 2008/0235238 A1 | 9/2008 | Jalobeanu et al. |
| 2008/0263179 A1 | 10/2008 | Buttner et al. |
| 2008/0276241 A1 | 11/2008 | Bajpai et al. |
| 2008/0319951 A1 | 12/2008 | Ueno et al. |
| 2009/0019029 A1 | 1/2009 | Tommaney et al. |
| 2009/0022095 A1 | 1/2009 | Spaur et al. |
| 2009/0024615 A1 | 1/2009 | Pedro et al. |
| 2009/0037391 A1 | 2/2009 | Agrawal et al. |
| 2009/0055370 A1 | 2/2009 | Dagum et al. |
| 2009/0083215 A1 | 3/2009 | Burger |
| 2009/0089312 A1 | 4/2009 | Chi et al. |
| 2009/0248902 A1 | 10/2009 | Blue |
| 2009/0254516 A1 | 10/2009 | Meiyyappan et al. |
| 2009/0300770 A1 | 12/2009 | Rowney et al. |
| 2009/0319058 A1 | 12/2009 | Rovaglio et al. |
| 2009/0319484 A1 | 12/2009 | Golbandi et al. |
| 2009/0327242 A1 | 12/2009 | Brown et al. |
| 2010/0036801 A1 | 2/2010 | Pirvali et al. |
| 2010/0042587 A1 | 2/2010 | Johnson et al. |
| 2010/0047760 A1 | 2/2010 | Best et al. |
| 2010/0049715 A1 | 2/2010 | Jacobsen et al. |

(56) References Cited

U.S. PATENT DOCUMENTS

| | | |
|---|---|---|
| 2010/0161555 A1 | 6/2010 | Nica et al. |
| 2010/0186082 A1 | 7/2010 | Ladki et al. |
| 2010/0199161 A1 | 8/2010 | Aureglia et al. |
| 2010/0205017 A1 | 8/2010 | Sichelman et al. |
| 2010/0205351 A1 | 8/2010 | Wiener et al. |
| 2010/0281005 A1 | 11/2010 | Carlin et al. |
| 2010/0281071 A1 | 11/2010 | Ben-Zvi et al. |
| 2011/0126110 A1 | 5/2011 | Vilke et al. |
| 2011/0126154 A1 | 5/2011 | Boehler et al. |
| 2011/0153603 A1 | 6/2011 | Adiba et al. |
| 2011/0161378 A1 | 6/2011 | Williamson |
| 2011/0167020 A1 | 7/2011 | Yang et al. |
| 2011/0178984 A1 | 7/2011 | Talius et al. |
| 2011/0194563 A1 | 8/2011 | Shen et al. |
| 2011/0219020 A1 | 9/2011 | Oks et al. |
| 2011/0314019 A1 | 12/2011 | Peris |
| 2012/0110030 A1 | 5/2012 | Pomponio |
| 2012/0144234 A1 | 6/2012 | Clark et al. |
| 2012/0159303 A1 | 6/2012 | Friedrich et al. |
| 2012/0191446 A1 | 7/2012 | Binsztok et al. |
| 2012/0192096 A1 | 7/2012 | Bowman et al. |
| 2012/0197868 A1 | 8/2012 | Fauser et al. |
| 2012/0209886 A1 | 8/2012 | Henderson |
| 2012/0215741 A1 | 8/2012 | Poole et al. |
| 2012/0221528 A1 | 8/2012 | Renkes |
| 2012/0246052 A1 | 9/2012 | Taylor et al. |
| 2012/0254143 A1 | 10/2012 | Varma et al. |
| 2012/0259759 A1 | 10/2012 | Crist et al. |
| 2012/0296846 A1 | 11/2012 | Teeter |
| 2013/0041946 A1 | 2/2013 | Joel et al. |
| 2013/0080514 A1 | 3/2013 | Gupta et al. |
| 2013/0086107 A1 | 4/2013 | Genochio et al. |
| 2013/0166556 A1 | 6/2013 | Baeumges et al. |
| 2013/0173667 A1 | 7/2013 | Soderberg et al. |
| 2013/0179460 A1 | 7/2013 | Cervantes et al. |
| 2013/0185619 A1 | 7/2013 | Ludwig |
| 2013/0191370 A1 | 7/2013 | Chen et al. |
| 2013/0198232 A1 | 8/2013 | Shamgunov et al. |
| 2013/0226959 A1 | 8/2013 | Dittrich et al. |
| 2013/0246560 A1 | 9/2013 | Feng et al. |
| 2013/0263123 A1 | 10/2013 | Zhou et al. |
| 2013/0290243 A1 | 10/2013 | Hazel et al. |
| 2013/0304725 A1 | 11/2013 | Nee et al. |
| 2013/0304744 A1 | 11/2013 | McSherry et al. |
| 2013/0311352 A1 | 11/2013 | Kayanuma et al. |
| 2013/0311488 A1 | 11/2013 | Erdogan et al. |
| 2013/0318129 A1 | 11/2013 | Vingralek et al. |
| 2013/0346365 A1 | 12/2013 | Kan et al. |
| 2014/0019494 A1 | 1/2014 | Tang |
| 2014/0040203 A1 | 2/2014 | Lu et al. |
| 2014/0059646 A1 | 2/2014 | Hannel et al. |
| 2014/0082724 A1 | 3/2014 | Pearson et al. |
| 2014/0136521 A1 | 5/2014 | Pappas |
| 2014/0143123 A1 | 5/2014 | Banke et al. |
| 2014/0149997 A1 | 5/2014 | Kukreja et al. |
| 2014/0156618 A1 | 6/2014 | Castellano |
| 2014/0173023 A1 | 6/2014 | Varney et al. |
| 2014/0181036 A1 | 6/2014 | Dhamankar et al. |
| 2014/0181081 A1 | 6/2014 | Veldhuizen |
| 2014/0188924 A1 | 7/2014 | Ma et al. |
| 2014/0195558 A1 | 7/2014 | Murthy et al. |
| 2014/0201194 A1 | 7/2014 | Reddy et al. |
| 2014/0215446 A1 | 7/2014 | Araya et al. |
| 2014/0222768 A1 | 8/2014 | Rambo et al. |
| 2014/0229506 A1 | 8/2014 | Lee |
| 2014/0229874 A1 | 8/2014 | Strauss |
| 2014/0244687 A1 | 8/2014 | Shmueli et al. |
| 2014/0279810 A1 | 9/2014 | Mann et al. |
| 2014/0280522 A1 | 9/2014 | Watte |
| 2014/0282227 A1 | 9/2014 | Nixon et al. |
| 2014/0282444 A1 | 9/2014 | Araya et al. |
| 2014/0282540 A1 | 9/2014 | Bonnet et al. |
| 2014/0297611 A1 | 10/2014 | Abbour et al. |
| 2014/0317084 A1 | 10/2014 | Chaudhry et al. |
| 2014/0324821 A1 | 10/2014 | Meiyyappan et al. |
| 2014/0330700 A1 | 11/2014 | Studnitzer et al. |
| 2014/0330807 A1 | 11/2014 | Weyerhaeuser et al. |
| 2014/0344186 A1 | 11/2014 | Nadler |
| 2014/0344391 A1 | 11/2014 | Varney et al. |
| 2014/0359574 A1 | 12/2014 | Beckwith et al. |
| 2014/0372482 A1 | 12/2014 | Martin et al. |
| 2014/0380051 A1 | 12/2014 | Edward et al. |
| 2015/0019516 A1 | 1/2015 | Wein et al. |
| 2015/0026155 A1 | 1/2015 | Martin |
| 2015/0067640 A1 | 3/2015 | Booker et al. |
| 2015/0074066 A1 | 3/2015 | Li et al. |
| 2015/0082218 A1 | 3/2015 | Affoneh et al. |
| 2015/0088894 A1 | 3/2015 | Czarlinska et al. |
| 2015/0095381 A1 | 4/2015 | Chen et al. |
| 2015/0120261 A1 | 4/2015 | Giannacopoulos et al. |
| 2015/0127599 A1 | 5/2015 | Schiebeler |
| 2015/0154262 A1 | 6/2015 | Yang et al. |
| 2015/0172117 A1 | 6/2015 | Dolinsky et al. |
| 2015/0188778 A1 | 7/2015 | Asayag et al. |
| 2015/0205588 A1 | 7/2015 | Bates et al. |
| 2015/0205589 A1 | 7/2015 | Daily |
| 2015/0254298 A1 | 9/2015 | Bourbonnais et al. |
| 2015/0304182 A1 | 10/2015 | Brodsky et al. |
| 2015/0317359 A1 | 11/2015 | Tran et al. |
| 2016/0026442 A1 | 1/2016 | Chhaparia |
| 2016/0065670 A1 | 3/2016 | Kimmel et al. |
| 2016/0092599 A1 | 3/2016 | Barsness et al. |
| 2016/0125018 A1 | 5/2016 | Tomoda et al. |
| 2016/0171070 A1 | 6/2016 | Hrle et al. |
| 2016/0253294 A1 | 9/2016 | Allen et al. |
| 2016/0316038 A1 | 10/2016 | Jolfaei |
| 2016/0335330 A1 | 11/2016 | Teodorescu et al. |
| 2016/0335361 A1 | 11/2016 | Teodorescu et al. |
| 2017/0161514 A1 | 6/2017 | Dettinger et al. |
| 2017/0235794 A1 | 8/2017 | Wright et al. |

FOREIGN PATENT DOCUMENTS

| | | |
|---|---|---|
| EP | 1198769 B1 | 6/2008 |
| EP | 2199961 A1 | 6/2010 |
| EP | 2423816 A1 | 2/2012 |
| EP | 2743839 A1 | 6/2014 |
| RU | 2421798 | 6/2011 |
| WO | 2000000879 A2 | 1/2000 |
| WO | 2001079964 A2 | 10/2001 |
| WO | 2011120161 A1 | 10/2011 |
| WO | 2012136627 A1 | 10/2012 |
| WO | 2014026220 A1 | 2/2014 |
| WO | 2014143208 A1 | 9/2014 |

OTHER PUBLICATIONS

"Change Data Capture", Oracle Database Online Documentation 11g Release 1 (11.1), dated Apr. 5, 2016. Retrieved from https://web.archive.org/web/20160405032625/http://docs.oracle.com/cd/B28359_01/server.111/b28313/cdc.htm.

"Chapter 24. Query access plans", Tuning Database Performance, DB2 Version 9.5 for Linux, UNIX, and Windows, pp. 301-462, dated Dec. 2010. Retrieved from http://public.dhe.ibm.com/ps/products/db2/info/vr95/pdf/en_US/DB2PerfTuneTroubleshoot-db2d3e953.pdf.

"GNU Emacs Manual", dated Apr. 15, 2016, pp. 43-47. Retrieved from https://web.archive.org/web/20160415175915/http://www.gnu.org/software/emacs/manual/html_mono/emacs.html.

"Google Protocol RPC Library Overview", dated Apr. 27, 2016. Retrieved from https://cloud.google.com/appengine/docs/python/tools/protorpc/ (last accessed Jun. 16, 2016).

"IBM—What is HBase?", dated Sep. 6, 2015. Retrieved from https://web.archive.org/web/20150906022050/http://www-01.ibm.com/software/data/infosphere/hadoop/hbase/.

"IBM Informix TimeSeries data management", dated Jan. 18, 2016. Retrieved from https://web.archive.org/web/20160118072141/http://www-01.ibm.com/software/data/informix/timeseries/.

"IBM InfoSphere BigInsights 3.0.0—Importing data from and exporting data to DB2 by using Sqoop", dated Jan. 15, 2015. Retrieved from https://web.archive.org/web/20150115034058/

(56) References Cited

OTHER PUBLICATIONS http://www-01.ibm.com/support/knowledgecenter/SSPT3X_3.0.0/com.ibm.swg.im.infosphere.biginsights.import.doc/doc/data_warehouse_sqoop.html.
"Maximize Data Value with Very Large Database Management by SAP Sybase IQ", dated 2013. Retrieved from http://www.sap.com/bin/sapcom/en_us/downloadasset.2013-06-jun-11-11.maximize-data-value-with-very-large-database-management-by-sap-sybase-iq-pdf.html.
"Microsoft Azure—Managing Access Control Lists (ACLs) for Endpoints by using PowerShell", dated Nov. 12, 2014. Retrieved from https://web.archive.org/web/20150110170715/http://msdn.microsoft.com/en-us/library/azure/dn376543.aspx.
"Oracle Big Data Appliance—Perfect Balance Java API", dated Sep. 20, 2015. Retrieved from https://web.archive.org/web/20131220040005/http://docs.oracle.com/cd/E41604_01/doc.22/e41667/toc.htm.
"Oracle Big Data Appliance—X5-2", dated Sep. 6, 2015. Retrieved from https://web.archive.org/web/20150906185409/http://www.oracle.com/technetwork/database/bigdata-appliance/overview/bigdataappliance-datasheet-1883358.pdf.
"Oracle Big Data Appliance Software User's Guide", dated Feb. 2015. Retrieved from https://docs.oracle.com/cd/E55905_01/doc.40/e55814.pdf.
"SAP HANA Administration Guide", dated Mar. 29, 2016, pp. 290-294. Retrieved from https://web.archive.org/web/20160417053656/http://help.sap.com/hana/SAP_HANA_Administration_Guide_en.pdf.
"Sophia Database—Architecture", dated Jan. 18, 2016. Retrieved from https://web.archive.org/web/20160118052919/http://sphia.org/architecture.html.
"Tracking Data Changes", SQL Server 2008 R2, dated Sep. 22, 2015. Retreived from https://web.archive.org/web/20150922000614/https://technet.microsoft.com/en-us/library/bb933994(v=sql.105).aspx.
"Use Formula AutoComplete", dated 2010. Retrieved from https://supportoffice.com/en-us/article/Use-Formula-AutoComplete-c7c46fa6-3a94-4150-a2f7-34140c1ee4d9 (last accessed Jun. 16, 2016).
Adelfio et al. "Schema Extraction for Tabular Data on the Web", Proceedings of the VLDB Endowment, vol. 6, No. 6. Apr. 2013. Retrieved from http://www.cs.umd.edu/~hjs/pubs/spreadsheets-vldb13.pdf.
Advisory Action dated Apr. 19, 2017, in U.S. Appl. No. 15/154,999.
Advisory Action dated Apr. 20, 2017, in U.S. Appl. No. 15/154,980.
Advisory Action dated Apr. 6, 2017, in U.S. Appl. No. 15/154,995.
Advisory Action dated Mar. 31, 2017, in U.S. Appl. No. 15/154,996.
Advisory Action dated May 3, 2017, in U.S. Appl. No. 15/154,993.
Borror, Jefferey A. "Q for Mortals 2.0", dated Nov. 1, 2011. Retreived from http://code.kx.com/wiki/JB:QforMortals2/contents.
Cheusheva, Svetlana. "How to change the row color based on a cell's value in Excel", dated Oct. 29, 2013. Retrieved from https://www.ablebits.com/office-addins-blog/2013/10/29/excel-change-row-background-color/ (last accessed Jun. 16, 2016).
Corrected Notice of Allowability dated Aug. 9, 2017, in U.S. Appl. No. 15/154,980.
Corrected Notice of Allowability dated Jul. 31, 2017, in U.S. Appl. No. 15/154,999.
Corrected Notice of Allowability dated Mar. 10, 2017, in U.S. Appl. No. 15/154,979.
Corrected Notice of Allowability dated Oct. 26, 2017, in U.S. Appl. No. 15/610,162.
Decision on Pre-Appeal Conference Request dated Nov. 20, 2017, in U.S. Appl. No. 15/154,997.
Ex Parte Quayle Action dated Aug. 8, 2016, in U.S. Appl. No. 15/154,999.
Final Office Action dated Apr. 10, 2017, in U.S. Appl. No. 15/155,006.
Final Office Action dated Dec. 19, 2016, in U.S. Appl. No. 15/154,995.
Final Office Action dated Feb. 24, 2017, in U.S. Appl. No. 15/154,993.
Final Office Action dated Jan. 27, 2017, in U.S. Appl. No. 15/154,980.
Final Office Action dated Jan. 31, 2017, in U.S. Appl. No. 15/154,996.
Final Office Action dated Jul. 27, 2017, in U.S. Appl. No. 15/154,993.
Final Office Action dated Jun. 23, 2017, in U.S. Appl. No. 15/154,997.
Final Office Action dated Mar. 1, 2017, in U.S. Appl. No. 15/154,975.
Final Office Action dated Mar. 13, 2017, in U.S. Appl. No. 15/155,012.
Final Office Action dated Mar. 31, 2017, in U.S. Appl. No. 15/155,005.
Final Office Action dated May 15, 2017, in U.S. Appl. No. 15/155,010.
Final Office Action dated May 4, 2017, in U.S. Appl. No. 15/155,009.
Gai, Lei et al. "An Efficient Summary Graph Driven Method for RDF Query Processing", dated Oct. 27, 2015. Retreived from http://arxiv.org/pdf/1510.07749.pdf.
International Search Report and Written Opinion dated Aug. 18, 2016, in International Appln. No. PCT/US2016/032582 filed May 14, 2016.
International Search Report and Written Opinion dated Aug. 18, 2016, in International Appln. No. PCT/US2016/032584 filed May 14, 2016.
International Search Report and Written Opinion dated Aug. 18, 2016, in International Appln. No. PCT/US2016/032588 filed May 14, 2016.
International Search Report and Written Opinion dated Aug. 18, 2016, in International Appln. No. PCT/US2016/032593 filed May 14, 2016.
International Search Report and Written Opinion dated Aug. 18, 2016, in International Appln. No. PCT/US2016/032597 filed May 14, 2016.
International Search Report and Written Opinion dated Aug. 18, 2016, in International Appln. No. PCT/US2016/032599 filed May 14, 2016.
Non-final Office Action dated Sep. 26, 2016, in U.S. Appl. No. 15/155,005.
Non-final Office Action dated Sep. 29, 2016, in U.S. Appl. No. 15/154,990.
Non-final Office Action dated Sep. 8, 2016, in U.S. Appl. No. 15/154,975.
Non-final Office Action dated Sep. 9, 2016, in U.S. Appl. No. 15/154,996.
Non-final Office Action dated Sep. 9, 2016, in U.S. Appl. No. 15/155,010.
Notice of Allowance dated Dec. 19, 2016, in U.S. Appl. No. 15/155,001.
Notice of Allowance dated Dec. 22, 2016, in U.S. Appl. No. 15/155,011.
Notice of Allowance dated Dec. 7, 2016, in U.S. Appl. No. 15/154,985.
Notice of Allowance dated Feb. 1, 2017, in U.S. Appl. No. 15/154,988.
Notice of Allowance dated Feb. 14, 2017, in U.S. Appl. No. 15/154,979.
Notice of Allowance dated Feb. 28, 2017, in U.S. Appl. No. 15/154,990.
Notice of Allowance dated Jan. 30, 2017, in U.S. Appl. No. 15/154,987.
Notice of Allowance dated Jul. 28, 2017, in U.S. Appl. No. 15/155,009.
Notice of Allowance dated Jun. 19, 2017, in U.S. Appl. No. 15/154,980.
Notice of Allowance dated Jun. 20, 2017, in U.S. Appl. No. 15/154,975.
Notice of Allowance dated Mar. 2, 2017, in U.S. Appl. No. 15/154,998.

(56) References Cited

OTHER PUBLICATIONS

Notice of Allowance dated Mar. 31, 2017, in U.S. Appl. No. 15/154,998.
Notice of Allowance dated May 10, 2017, in U.S. Appl. No. 15/154,988.
Notice of Allowance dated Nov. 17, 2016, in U.S. Appl. No. 15/154,991.
Notice of Allowance dated Nov. 17, 2017, in U.S. Appl. No. 15/154,993.
Notice of Allowance dated Nov. 21, 2016, in U.S. Appl. No. 15/154,983.
Notice of Allowance dated Nov. 8, 2016, in U.S. Appl. No. 15/155,007.
Notice of Allowance dated Oct. 11, 2016, in U.S. Appl. No. 15/155,007.
Notice of Allowance dated Oct. 21, 2016, in U.S. Appl. No. 15/154,999.
Notice of Allowance dated Oct. 6, 2017, in U.S. Appl. No. 15/610,162.
Palpanas, Themistoklis et al. "Incremental Maintenance for Non-Distributive Aggregate Functions", Proceedings of the 28th VLDB Conference, 2002. Retrieved from http://www.vldb.org/conf/2002/S22P04.pdf.
PowerShell Team, Intellisense in Windows PowerShell ISE 3.0, dated Jun. 12, 2012, Windows PowerShell Blog, pp. 1-6 Retrieved: https://biogs.msdn.microsoft.com/powershell/2012/06/12/intel-lisense-in-windows-powershell-ise-3-0/.
Smith, Ian. "Guide to Using SQL: Computed and Automatic Columns." Rdb Jornal, dated Sep. 2008, retrieved Aug. 15, 2016, retrieved from the Internet <URL: http://www.oracle.com/technetwork/products/rdb/automatic-columns-132042.pdf>.
Wes McKinney & PyData Development Team. "pandas: powerful Python data analysis toolkit, Release 0.16.1" Dated May 11, 2015. Retrieved from: http://pandas.pydata.org/pandas-docs/version/0.16.1/index.html.
Wes McKinney & PyData Development Team. "pandas: powerful Python data analysis toolkit, Release 0.18.1" Dated May 3, 2016. Retrieved from: http://pandas.pydata.org/pandas-docs/version/0.18.1/index.html.
Wu, Buwen et al. "Scalable SPARQL Querying using Path Partitioning", 31st IEEE International Conference on Data Engineering (ICDE 2015), Seoul, Korea, Apr. 13-17, 2015. Retrieved from http://imada.sdu.dk/~zhou/papers/icde2015.pdf.
Advisory Action dated Dec. 21, 2017, in U.S. Appl. No. 15/154,984.
Final Office Action dated Dec. 29, 2017, in U.S. Appl. No. 15/154,974.
Non-final Office Action dated Dec. 28, 2017, in U.S. Appl. No. 15/154,996.
Non-final Office Action dated Dec. 28, 2017, in U.S. Appl. No. 15/796,230.
Non-final Office Action dated Jan. 4, 2018, in U.S. Appl. No. 15/583,777.
Sobell, Mark G. "A Practical Guide to Linux, Commands, Editors and Shell Programming." Third Edition, dated Sep. 14, 2012. Retrieved from: http://techbus.safaribooksonline.com/book/operating-systems-and-server-administration/linux/9780133085129.
International Search Report and Written Opinion dated Aug. 18, 2016, in International Appln. No. PCT/US2016/032605 filed May 14, 2016.
International Search Report and Written Opinion dated Aug. 25, 2016, in International Appln. No. PCT/US2016/032590 filed May 14, 2016.
International Search Report and Written Opinion dated Aug. 25, 2016, in International Appln. No. PCT/US2016/032592 filed May 14, 2016.
International Search Report and Written Opinion dated Aug. 4, 2016, in International Appln. No. PCT/US2016/032581 filed May 14, 2016.
International Search Report and Written Opinion dated Jul. 28, 2016, in International Appln. No. PCT/US2016/032586 filed May 14, 2016.
International Search Report and Written Opinion dated Jul. 28, 2016, in International Appln. No. PCT/US2016/032587 filed May 14, 2016.
International Search Report and Written Opinion dated Jul. 28, 2016, in International Appln. No. PCT/US2016/032589 filed May 14, 2016.
International Search Report and Written Opinion dated Sep. 1, 2016, in International Appln. No. PCT/US2016/032596 filed May 14, 2016.
International Search Report and Written Opinion dated Sep. 1, 2016, in International Appln. No. PCT/US2016/032598 filed May 14, 2016.
International Search Report and Written Opinion dated Sep. 1, 2016, in International Appln. No. PCT/US2016/032601 filed May 14, 2016.
International Search Report and Written Opinion dated Sep. 1, 2016, in International Appln. No. PCT/US2016/032602 filed May 14, 2016.
International Search Report and Written Opinion dated Sep. 1, 2016, in International Appln. No. PCT/US2016/032607 filed May 14, 2016.
International Search Report and Written Opinion dated Sep. 15, 2016, in International Appln. No. PCT/US2016/032591 filed May 14, 2016.
International Search Report and Written Opinion dated Sep. 15, 2016, in International Appln. No. PCT/US2016/032594 filed May 14, 2016.
International Search Report and Written Opinion dated Sep. 15, 2016, in International Appln. No. PCT/US2016/032600 filed May 14, 2016.
International Search Report and Written Opinion dated Sep. 29, 2016, in International Appln. No. PCT/US2016/032595 filed May 14, 2016.
International Search Report and Written Opinion dated Sep. 29, 2016, in International Appln. No. PCT/US2016/032606 filed May 14, 2016.
International Search Report and Written Opinion dated Sep. 8, 2016, in International Appln. No. PCT/US2016/032603 filed May 14, 2016.
International Search Report and Written Opinion dated Sep. 8, 2016, in International Appln. No. PCT/US2016/032604 filed May 14, 2016.
Jellema, Lucas. "Implementing Cell Highlighting in JSF-based Rich Enterprise Apps (Part 1)", dated Nov. 2008. Retrieved from http://www.oracle.com/technetwork/articles/adf/jellema-adfcellhighlight-ing-087850.html (last accessed Jun. 16, 2016).
Lou, Yuan. "A Multi-Agent Decision Support System for Stock Trading", IEEE Network, Jan./Feb. 2002. Retrieved from http://www.reading.ac.uk/AcaDepts/si/sisweb13/ais/papers/journal12-A%20multi-agent%20Framework.pdf.
Mallet, "Relational Database Support for Spatio-Temporal Data", Technical Report TR 04-21, Sep. 2004, University of Alberta, Department of Computing Science.
Mariyappan, Balakrishnan. "10 Useful Linux Bash_Completion Complete Command Examples (Bash Command Line Completion on Steroids)", dated Dec. 2, 2013. Retrieved from http://www.thegeekstuff.com/2013/12/bash-completion-complete/ (last accessed Jun. 16, 2016).
Murray, Derek G. et al. "Naiad: a timely dataflow system." SOSP '13 Proceedings of the Twenty-Fourth ACM Symposium on Operating Systems Principles. pp. 439-455. Nov. 2013.
Non-final Office Action dated Apr. 19, 2017, in U.S. Appl. No. 15/154,974.
Non-final Office Action dated Aug. 12, 2016, in U.S. Appl. No. 15/155,001.
Non-final Office Action dated Aug. 14, 2017, in U.S. Appl. No. 15/464,314.
Non-final Office Action dated Aug. 16, 2016, in U.S. Appl. No. 15/154,993.

(56) References Cited

OTHER PUBLICATIONS

Non-final Office Action dated Aug. 19, 2016, in U.S. Appl. No. 15/154,991.
Non-final Office Action dated Aug. 25, 2016, in U.S. Appl. No. 15/154,980.
Non-final Office Action dated Aug. 26, 2016, in U.S. Appl. No. 15/154,995.
Non-final Office Action dated Aug. 8, 2016, in U.S. Appl. No. 15/154,983.
Non-final Office Action dated Aug. 8, 2016, in U.S. Appl. No. 15/154,985.
Non-final Office Action dated Dec. 13, 2017, in U.S. Appl. No. 15/608,963.
Non-final Office Action dated Feb. 8, 2017, in U.S. Appl. No. 15/154,997.
Non-final Office Action dated Jul. 27, 2017, in U.S. Appl. No. 15/154,995.
Non-final Office Action dated Mar. 2, 2017, in U.S. Appl. No. 15/154,984.
Non-final Office Action dated Nov. 15, 2017, in U.S. Appl. No. 15/654,461.
Non-final Office Action dated Nov. 17, 2016, in U.S. Appl. No. 15/154,999.
Non-final Office Action dated Nov. 21, 2017, in U.S. Appl. No. 15/155,005.
Non-final Office Action dated Nov. 30, 2017, in U.S. Appl. No. 15/155,012.
Non-final Office Action dated Oct. 13, 2016, in U.S. Appl. No. 15/155,009.
Non-final Office Action dated Oct. 27, 2016, in U.S. Appl. No. 15/155,006.
Non-final Office Action dated Oct. 7, 2016, in U.S. Appl. No. 15/154,998.
Non-final Office Action dated Sep. 1, 2016, in U.S. Appl. No. 15/154,979.
Non-final Office Action dated Sep. 1, 2016, in U.S. Appl. No. 15/155,011.
Non-final Office Action dated Sep. 1, 2016, in U.S. Appl. No. 15/155,012.
Non-final Office Action dated Sep. 14, 2016, in U.S. Appl. No. 15/154,984.
Non-final Office Action dated Sep. 16, 2016, in U.S. Appl. No. 15/154,988.
Non-final Office Action dated Sep. 22, 2016, in U.S. Appl. No. 15/154,987.
Breitbart, Update Propagation Protocols For Replicated Databases, SIGMOD '99 Philadelphia PA, 1999, pp. 97-108.
Kramer, The Combining DAG: A Technique for Parallel Data Flow Analysis, IEEE Transactions on Parallel and Distributed Systems, vol. 5, No. 8, Aug. 1994, pp. 805-813.
Non-final Office Action dated Feb. 12, 2018, in U.S. Appl. No. 15/466,836.
Non-final Office Action dated Feb. 15, 2018, in U.S. Appl. No. 15/813,112.
Notice of Allowance dated Feb. 12, 2018, in U.S. Appl. No. 15/813,142.
Kramer, The Combining DAG: A Technique for Parallel Data Flow Analysis. IEEE Transactions on Parallel and Distributed Systems, vol. 5, No. 8, Aug. 1994, pp. 805-813.

400 GUI display with hidden color GUI display effect column

402 Content with color formula for AvgPrice < $90 (RED) & > $100 (GREEN)

404 Hidden Column

| SYMBOL | MONTH | AVGPRICE | AVGPRICE CELL COLOR |
|---|---|---|---|
| AAPL | JAN | $99.83 | NULL |
| AAPL | FEB | $101.96 | GREEN |
| AAPL | MAR | $103.54 | GREEN |
| AAPL | APR | $98.23 | NULL |
| AAPL | MAY | $92.87 | NULL |
| AAPL | JUN | $89.13 | RED |
| AAPL | JUL | $90.01 | NULL |
| AAPL | AUG | $88.56 | RED |
| AAPL | SEP | $96.72 | NULL |
| AAPL | OCT | $103.79 | GREEN |
| AAPL | NOV | $109.33 | GREEN |
| AAPL | DEC | $115.92 | GREEN |

FIG. 4

450 GUI visible content with a cell color GUI display effect applied

| SYMBOL | MONTH | AVGPRICE |
|--------|-------|----------|
| AAPL | JAN | $99.83 |
| AAPL | FEB | $101.96 → GREEN 452 |
| AAPL | MAR | $103.54 → GREEN 454 |
| AAPL | APR | $98.23 |
| AAPL | MAY | $92.87 |
| AAPL | JUN | $89.13 → RED 456 |
| AAPL | JUL | $90.01 |
| AAPL | AUG | $88.56 → RED 458 |
| AAPL | SEP | $96.72 |
| AAPL | OCT | $103.79 → GREEN 460 |
| AAPL | NOV | $109.33 → GREEN 462 |
| AAPL | DEC | $115.92 → GREEN 464 |

FIG. 4A

500 GUI display with hidden color GUI display effect column

502 Content with color formula for AvgPrice < $90 (RED) & > $100 (GREEN)

504 Hidden Column

| SYMBOL | MONTH | AVGPRICE | AVGPRICE ROW COLOR |
|---|---|---|---|
| AAPL | JAN | $99.83 | NULL |
| AAPL | FEB | $101.96 | GREEN |
| AAPL | MAR | $103.54 | GREEN |
| AAPL | APR | $98.23 | NULL |
| AAPL | MAY | $92.87 | NULL |
| AAPL | JUN | $89.13 | RED |
| AAPL | JUL | $90.01 | NULL |
| AAPL | AUG | $88.56 | RED |
| AAPL | SEP | $96.72 | NULL |
| AAPL | OCT | $103.79 | GREEN |
| AAPL | NOV | $109.33 | GREEN |
| AAPL | DEC | $115.92 | GREEN |

FIG. 5

550 GUI visible content with a row color GUI display effect applied

| SYMBOL | MONTH | AVGPRICE | |
|---|---|---|---|
| AAPL | JAN | $99.83 | |
| AAPL | FEB | $101.96 | → GREEN 552 |
| AAPL | MAR | $103.54 | → GREEN 554 |
| AAPL | APR | $98.23 | |
| AAPL | MAY | $92.87 | |
| AAPL | JUN | $89.13 | → RED 556 |
| AAPL | JUL | $90.01 | |
| AAPL | AUG | $88.56 | → RED 558 |
| AAPL | SEP | $96.72 | |
| AAPL | OCT | $103.79 | → GREEN 560 |
| AAPL | NOV | $109.33 | → GREEN 562 |
| AAPL | DEC | $115.92 | → GREEN 564 |

FIG. 5A

700 GUI display with hidden font GUI display effect column

702 Content with font formula for AvgPrice > $100 (ITALICS)

704 Hidden Column

| SYMBOL | MONTH | AVGPRICE | AVGPRICE CELL FONT |
|---|---|---|---|
| AAPL | JAN | $99.83 | NULL |
| AAPL | FEB | $101.96 | ITALICS |
| AAPL | MAR | $103.54 | ITALICS |
| AAPL | APR | $98.23 | NULL |
| AAPL | MAY | $92.87 | NULL |
| AAPL | JUN | $89.13 | NULL |
| AAPL | JUL | $90.01 | NULL |
| AAPL | AUG | $88.56 | NULL |
| AAPL | SEP | $96.72 | NULL |
| AAPL | OCT | $103.79 | ITALICS |
| AAPL | NOV | $109.33 | ITALICS |
| AAPL | DEC | $115.92 | ITALICS |

FIG. 7

750 GUI visible content with a cell font GUI display effect applied

| SYMBOL | MONTH | AVGPRICE |
|---|---|---|
| AAPL | JAN | $99.83 |
| AAPL | FEB | *$101.96* |
| AAPL | MAR | *$103.54* |
| AAPL | APR | $98.23 |
| AAPL | MAY | $92.87 |
| AAPL | JUN | $89.13 |
| AAPL | JUL | $90.01 |
| AAPL | AUG | $88.56 |
| AAPL | SEP | $96.72 |
| AAPL | OCT | *$103.79* |
| AAPL | NOV | *$109.33* |
| AAPL | DEC | *$115.92* |

FIG. 7A

800 GUI display with hidden font GUI display effect column

802 Content with font formula for AvgPrice > $100 (ITALICS)

804 Hidden Column

| SYMBOL | MONTH | AVGPRICE | AVGPRICE ROW FONT |
|---|---|---|---|
| AAPL | JAN | $99.83 | NULL |
| AAPL | FEB | $101.96 | ITALICS |
| AAPL | MAR | $103.54 | ITALICS |
| AAPL | APR | $98.23 | NULL |
| AAPL | MAY | $92.87 | NULL |
| AAPL | JUN | $89.13 | NULL |
| AAPL | JUL | $90.01 | NULL |
| AAPL | AUG | $88.56 | NULL |
| AAPL | SEP | $96.72 | NULL |
| AAPL | OCT | $103.79 | ITALICS |
| AAPL | NOV | $109.33 | ITALICS |
| AAPL | DEC | $115.92 | ITALICS |

FIG. 8

850 GUI visible content with a row color GUI display effect applied

| SYMBOL | MONTH | AVGPRICE |
|--------|-------|----------|
| AAPL | JAN | $99.83 |
| *AAPL* | *FEB* | *$101.96* |
| *AAPL* | *MAR* | *$103.54* |
| AAPL | APR | $98.23 |
| AAPL | MAY | $92.87 |
| AAPL | JUN | $89.13 |
| AAPL | JUL | $90.01 |
| AAPL | AUG | $88.56 |
| AAPL | SEP | $96.72 |
| *AAPL* | *OCT* | *$103.79* |
| *AAPL* | *NOV* | *$109.33* |
| *AAPL* | *DEC* | *$115.92* |

FIG. 8A

APPLYING A GUI DISPLAY EFFECT FORMULA IN A HIDDEN COLUMN TO A SECTION OF DATA

This application claims the benefit of U.S. Provisional Application No. 62/161,813, entitled "Computer Data System" and filed on May 14, 2015, which is incorporated herein by reference in its entirety.

Embodiments relate generally to computer data systems, and more particularly, to methods, systems and computer readable media for providing GUI display effect formatting for the display of data based on the content of the data.

Graphical user interfaces (GUI) can display a multitude of data in many different formats including a table row and column format or a spreadsheet cell format. The larger the screen and the smaller the font size, the more rows and cells that can be simultaneously displayed on the GUI. Rows and cells can also be presented in a rolling screen format with the addition of fresh row or cell data causing older row or cell data to roll off the screen and out of sight. Under such conditions, important or crucial data can be missed or overlooked by a user. In addition to rolling screen data, data sources can also be dynamic. Dynamic data sources can have data added or modified frequently. A change to a dynamic data source that is being displayed and updated in real-time intervals on the screen can cause a change to an important or critical value used in decision making that might be overlooked by a user.

Embodiments were conceived in light of the above mentioned needs, problems and/or limitations, among other things.

Some implementations can include a system for formatting data for display on a computer display screen, the system comprising one or more hardware processors. The system can also include a computer display screen configured to display data via a graphical user interface (GUI). The system can further include a computer readable data storage device coupled to the one or more hardware processors, the computer readable data storage device having stored thereon software instructions that, when executed by the one or more hardware processors, cause the one or more hardware processors to perform operations. The operations can include receiving a digital signal containing a GUI display effect formatting command for data stored in a computer medium. The operations can also include creating a GUI display effect formula for a formatting column. The operations can include hiding the formatting column from being displayed by the graphical user interface on the computer display screen. The operations can also include dynamically computing a GUI display effect using the GUI display effect formula for a formatting column. The operations can further include choosing a section of data to be displayed on the computer display screen via the graphical user interface. The operations can include computing the GUI display effect for the section of data to be displayed on the the computer display screen via the graphical interface using the hidden formatting column. The operations can also include applying the computed GUI display effect to the section of data to be displayed. The operations can include displaying on the computer display screen the section of data with the applied computed GUI display effect.

The operations can further include applying the GUI display effect formatting by applying a formula to associated data in a same row of data.

The operations can include wherein applying the GUI display effect formatting includes applying a GUI display effect to at least one of an entire row of data, an entire column of data, an entire table, a tab, a browser, and a graphical user interface.

The operations can also include wherein the the section of data to be displayed on the graphical interface using the hidden formatting column is determined by scrolling.

The operations can also include receiving updates to the section of data to be displayed on the graphical user interface. The operations can include using a processor, dynamically computing a GUI display effect for the updates to the section of data using the GUI display effect formula for a formatting column. The operations can further include choosing a section of data to be displayed on the graphical user interface. The operations can include computing the GUI display effect for the section of data to be displayed on the graphical interface using the hidden formatting column. The operations can include applying the computed GUI display effect to the section of data to be displayed. The operations can also include displaying the section of data with the applied computed GUI display effect.

The operations can include wherein computing the GUI display effect occurs prior to displaying the section of data.

The operations can include wherein computing the GUI display effect occurs at the time of displaying the section of data.

Some implementations can include a method for formatting data displayed in a graphical user interface (GUI) comprising receiving a GUI display effect formatting command for data stored in a computer medium. The method can also include creating a GUI display effect formula for a formatting column. The method can further include hiding the formatting column from being displayed by the graphical user interface. The method can include using a processor, dynamically computing a GUI display effect using the GUI display effect formula for a formatting column. The method can also include choosing a section of data to be displayed on the graphical user interface. The method can include computing the GUI display effect for the section of data to be displayed on the graphical interface using the hidden formatting column. The method can also include applying the computed GUI display effect to the section of data to be displayed. The method can further include displaying the section of data with the applied computed GUI display effect.

The method can further include applying the GUI display effect formatting by applying a formula to associated data in a same row of data.

The method can include wherein applying the GUI display effect formatting includes applying a GUI display effect to at least one of an entire row of data, an entire column of data, an entire table, a tab, a browser, and a graphical user interface.

The method can also include wherein the the section of data to be displayed on the graphical interface using the hidden formatting column is determined by scrolling.

The method can include receiving updates to the section of data to be displayed on the graphical user interface. The method can also include using a processor, dynamically computing a GUI display effect for the updates to the section of data using the GUI display effect formula for a formatting column. The method can further include choosing a section of data to be displayed on the graphical user interface. The method can include computing the GUI display effect for the section of data to be displayed on the graphical interface using the hidden formatting column. The method can include applying the computed GUI display effect to the section of data to be displayed. The method can also include displaying the section of data with the applied computed GUI display effect.

The method can include wherein computing the GUI display effect occurs prior to displaying the section of data.

Some implementations can include a nontransitory computer readable medium having stored thereon software instructions that, when executed by one or more processors, cause the one or more processors to perform operations. The operations can include receiving a digital signal containing a GUI display effect formatting command for data stored in a computer medium. The operations can also include creating a GUI display effect formula for a formatting column. The operations can further include hiding the formatting column from being displayed by the graphical user interface on the computer display screen. The operations can include dynamically computing a GUI display effect using the GUI display effect formula for a formatting column. The operations can also include choosing a section of data to be displayed on the computer display screen via the graphical user interface. The operations can include computing the GUI display effect for the section of data to be displayed on the the the computer display screen via the graphical interface using the hidden formatting column. The operations can also include applying the computed GUI display effect to the section of data to be displayed. The operations can include displaying on the computer display screen the section of data with the applied computed GUI display effect.

The operations can include applying the GUI display effect formatting by applying a formula to associated data in a same row of data.

The operations can include wherein applying the GUI display effect formatting includes applying a GUI display effect to at least one of an entire row of data, an entire column of data, an entire table, a tab, a browser, and a graphical user interface.

The operations can include wherein the the section of data to be displayed on the graphical interface using the hidden formatting column is determined by scrolling.

The operations can include receiving updates to the section of data to be displayed on the graphical user interface. The operations can also include using a processor, dynamically computing a GUI display effect for the updates to the section of data using the GUI display effect formula for a formatting column. The operations can further include choosing a section of data to be displayed on the graphical user interface. The operations can include computing the GUI display effect for the section of data to be displayed on the graphical interface using the hidden formatting column. The operations can also include applying the computed GUI display effect to the section of data to be displayed. The operations can include displaying the section of data with the applied computed GUI display effect.

The operations can include wherein computing the GUI display effect occurs prior to displaying the section of data.

The operations can also include wherein computing the GUI display effect occurs at the time of displaying the section of data.

BRIEF DESCRIPTION OF THE DRAWINGS

FIG. 4 is a diagram of an example of a GUI display with hidden GUI display effect column in accordance with some implementations.

FIG. 4A is a diagram of an example GUI visible content with a cell GUI display effect applied in accordance with some implementations.

FIG. 5 is a diagram of an example of a GUI display with hidden GUI display effect column in accordance with some implementations.

FIG. 5A is a diagram of an example GUI visible content with a row GUI display effect applied in accordance with some implementations.

FIG. 7 is a diagram of an example of a GUI display with hidden GUI display effect column in accordance with some implementations.

FIG. 7A is a diagram of an example GUI visible content with a cell GUI display effect applied in accordance with some implementations.

FIG. 8 is a diagram of an example of a GUI display with hidden GUI display effect column in accordance with some implementations.

FIG. 8A is a diagram of an example GUI visible content with a row GUI display effect applied in accordance with some implementations.

DETAILED DESCRIPTION

Reference is made herein to the Java programming language, Java classes, Java bytecode and the Java Virtual Machine (JVM) for purposes of illustrating example implementations. It will be appreciated that implementations can include other programming languages (e.g., groovy, Scala, R, Go, etc.), other programming language structures as an alternative to or in addition to Java classes (e.g., other language classes, objects, data structures, program units, code portions, script portions, etc.), other types of bytecode, object code and/or executable code, and/or other virtual machines or hardware implemented machines configured to execute a data system query.

Figure 1:
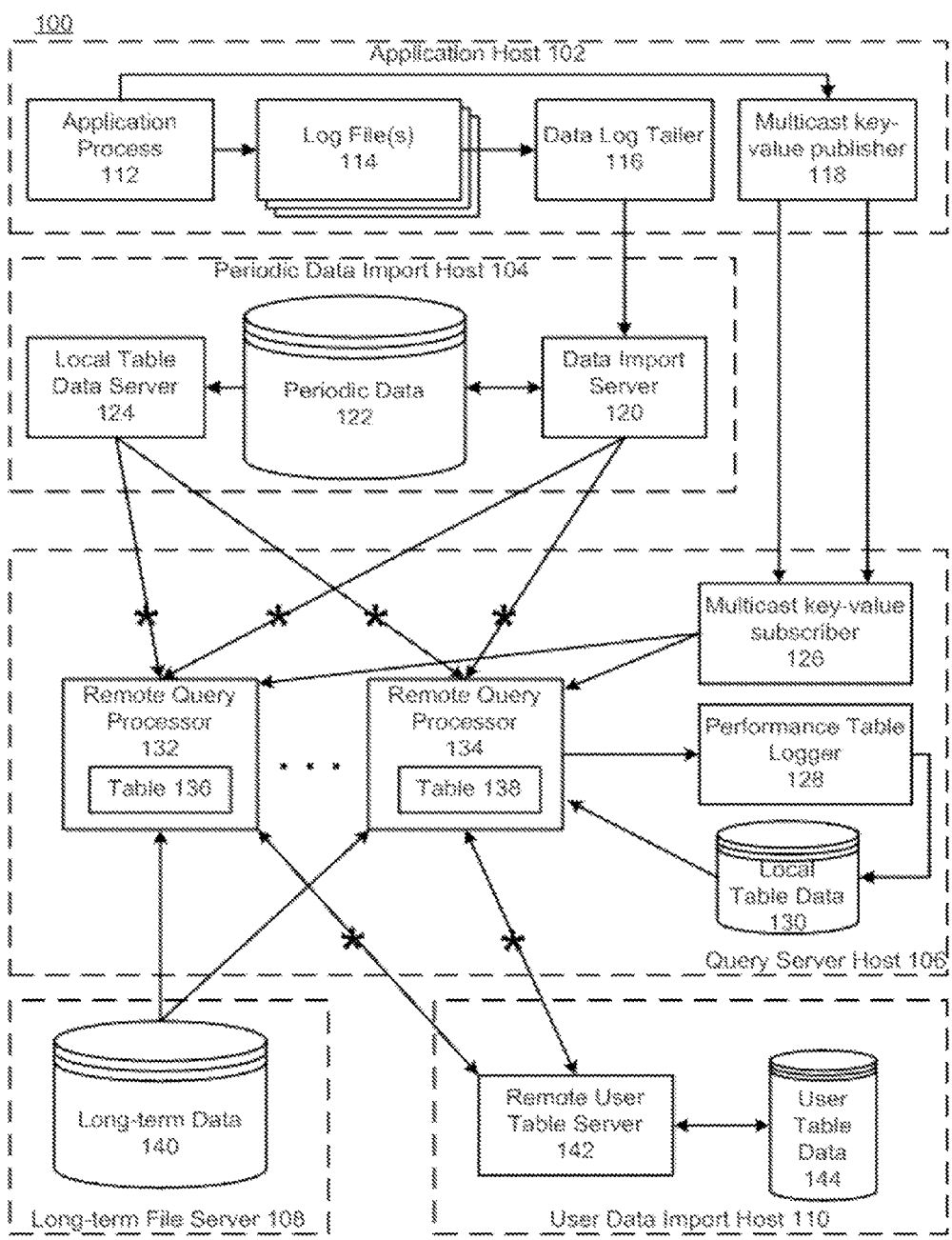
FIG. 1 is a diagram of an example computer data system showing an example data distribution configuration in accordance with some implementations.
Figure 2:
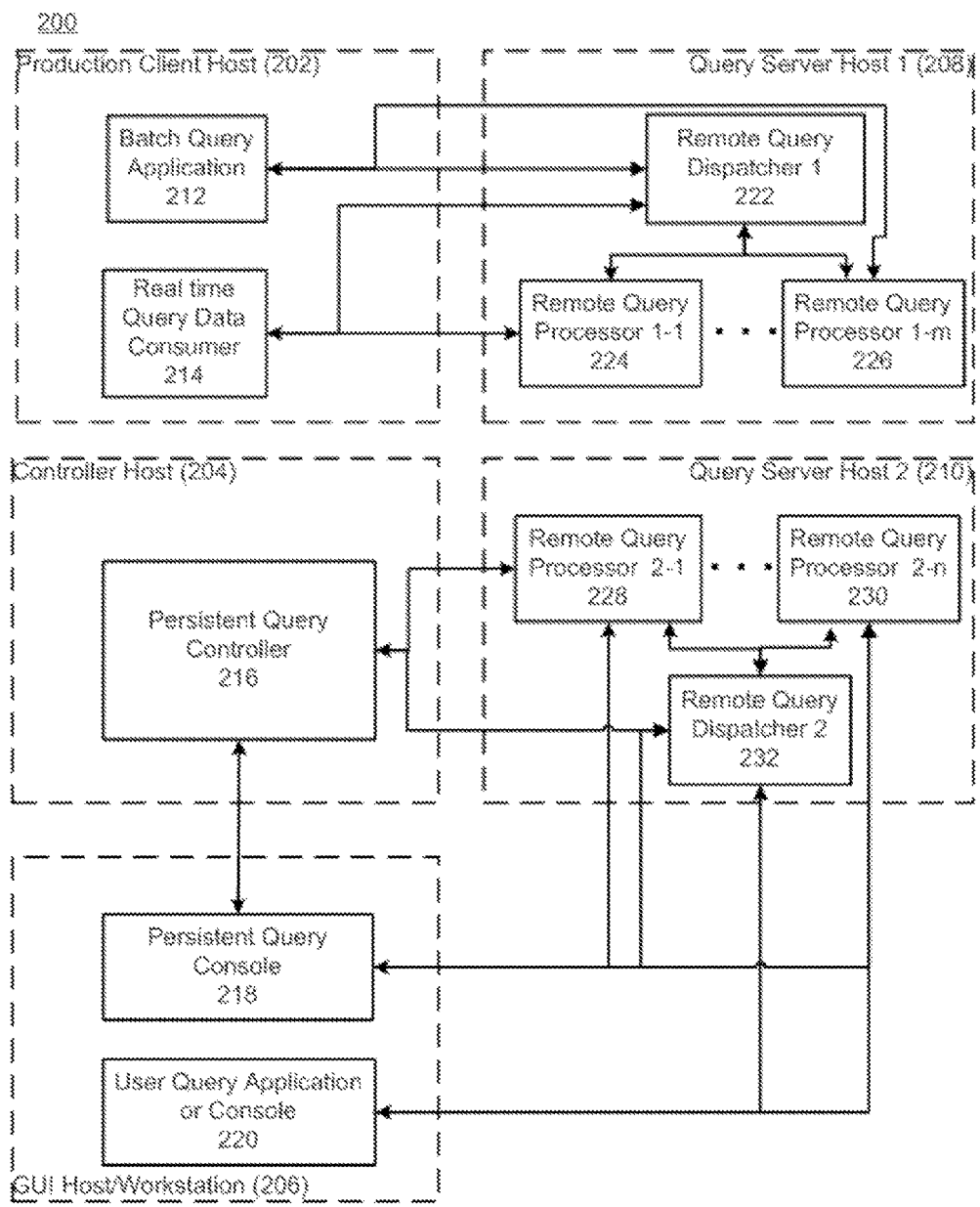
FIG. 2 is a diagram of an example computer data system showing an example administration/process control arrangement in accordance with some implementations.

FIG. 1 is a diagram of an example computer data system and network 100 showing an example data distribution configuration in accordance with some implementations. In particular, the system 100 includes an application host 102, a periodic data import host 104, a query server host 106, a long-term file server 108, and a user data import host 110. While tables are used as an example data object in the description below, it will be appreciated that the data system described herein can also process other data objects such as mathematical objects (e.g., a singular value decomposition of values in a given range of one or more rows and columns of a table), TableMap objects, etc. A TableMap object provides the ability to lookup a Table by some key. This key represents a unique value (or unique tuple of values) from the columns aggregated on in a byExternal( ) statement execution, for example. A TableMap object is can be the result of a byExternal( ) statement executed as part of a query. It will also be appreciated that the configurations shown in FIGS. 1 and 2 are for illustration purposes and in a given implementation each data pool (or data store) may be directly attached or may be managed by a file server.

The application host 102 can include one or more application processes 112, one or more log files 114 (e.g., sequential, row-oriented log files), one or more data log tailers 116 and a multicast key-value publisher 118. The periodic data import host 104 can include a local table data server, direct or remote connection to a periodic table data store 122 (e.g., a column-oriented table data store) and a data import server 120. The query server host 106 can include a multicast key-value subscriber 126, a performance table logger 128, local table data store 130 and one or more remote query processors (132, 134) each accessing one or more respective tables (136, 138). The long-term file server 108 can include a long-term data store 140. The user data import host 110 can include a remote user table server 142 and a user table data store 144. Row-oriented log files and column-oriented table data stores are discussed herein for illustration purposes and are not intended to be limiting. It will be appreciated that log files and/or data stores may be configured in other ways. In general, any data stores discussed herein could be configured in a manner suitable for a contemplated implementation.

In operation, the input data application process 112 can be configured to receive input data from a source (e.g., a securities trading data source), apply schema-specified, generated code to format the logged data as it's being prepared for output to the log file 114 and store the received data in the sequential, row-oriented log file 114 via an optional data logging process. In some implementations, the data logging process can include a daemon, or background process task, that is configured to log raw input data received from the application process 112 to the sequential, row-oriented log files on disk and/or a shared memory queue (e.g., for sending data to the multicast publisher 118). Logging raw input data to log files can additionally serve to provide a backup copy of data that can be used in the event that downstream processing of the input data is halted or interrupted or otherwise becomes unreliable.

A data log tailer 116 can be configured to access the sequential, row-oriented log file(s) 114 to retrieve input data logged by the data logging process. In some implementations, the data log tailer 116 can be configured to perform strict byte reading and transmission (e.g., to the data import server 120). The data import server 120 can be configured to store the input data into one or more corresponding data stores such as the periodic table data store 122 in a column-oriented configuration. The periodic table data store 122 can be used to store data that is being received within a time period (e.g., a minute, an hour, a day, etc.) and which may be later processed and stored in a data store of the long-term file server 108. For example, the periodic table data store 122 can include a plurality of data servers configured to store periodic securities trading data according to one or more characteristics of the data (e.g., a data value such as security symbol, the data source such as a given trading exchange, etc.).

The data import server 120 can be configured to receive and store data into the periodic table data store 122 in such a way as to provide a consistent data presentation to other parts of the system. Providing/ensuring consistent data in this context can include, for example, recording logged data to a disk or memory, ensuring rows presented externally are available for consistent reading (e.g., to help ensure that if the system has part of a record, the system has all of the record without any errors), and preserving the order of records from a given data source. If data is presented to clients, such as a remote query processor (132, 134), then the data may be persisted in some fashion (e.g., written to disk).

The local table data server 124 can be configured to retrieve data stored in the periodic table data store 122 and provide the retrieved data to one or more remote query processors (132, 134) via an optional proxy.

The remote user table server (RUTS) 142 can include a centralized consistent data writer, as well as a data server that provides processors with consistent access to the data that it is responsible for managing. For example, users can provide input to the system by writing table data that is then consumed by query processors.

The remote query processors (132, 134) can use data from the data import server 120, local table data server 124 and/or from the long-term file server 108 to perform queries. The remote query processors (132, 134) can also receive data from the multicast key-value subscriber 126, which receives data from the multicast key-value publisher 118 in the application host 102. The performance table logger 128 can log performance information about each remote query processor and its respective queries into a local table data store 130. Further, the remote query processors can also read data from the RUTS, from local table data written by the performance logger, or from user table data read over NFS.

It will be appreciated that the configuration shown in FIG. 1 is a typical example configuration that may be somewhat idealized for illustration purposes. An actual configuration may include one or more of each server and/or host type. The hosts/servers shown in FIG. 1 (e.g., 102-110, 120, 124 and 142) may each be separate or two or more servers may be combined into one or more combined server systems. Data stores can include local/remote, shared/isolated and/or redundant. Any table data may flow through optional proxies indicated by an asterisk on certain connections to the remote query processors. Also, it will be appreciated that the term "periodic" is being used for illustration purposes and can include, but is not limited to, data that has been received within a given time period (e.g., millisecond, second, minute, hour, day, week, month, year, etc.) and which has not yet been stored to a long-term data store (e.g., 140).

FIG. 2 is a diagram of an example computer data system 200 showing an example administration/process control arrangement in accordance with some implementations. The system 200 includes a production client host 202, a controller host 204, a GUI host or workstation 206, and query server hosts 208 and 210. It will be appreciated that there may be one or more of each of 202-210 in a given implementation.

The production client host 202 can include a batch query application 212 (e.g., a query that is executed from a command line interface or the like) and a real time query data consumer process 214 (e.g., an application that connects to and listens to tables created from the execution of a separate query). The batch query application 212 and the real time query data consumer 214 can connect to a remote query dispatcher 222 and one or more remote query processors (224, 226) within the query server host 1 208.

The controller host 204 can include a persistent query controller 216 configured to connect to a remote query dispatcher 232 and one or more remote query processors 228-230. In some implementations, the persistent query controller 216 can serve as the "primary client" for persistent queries and can request remote query processors from dispatchers, and send instructions to start persistent queries. For example, a user can submit a query to 216, and 216 starts and runs the query every day. In another example, a securities trading strategy could be a persistent query. The persistent query controller can start the trading strategy query every morning before the market opened, for instance. It will be appreciated that 216 can work on times other than days. In some implementations, the controller may require its own clients to request that queries be started, stopped, etc. This can be done manually, or by scheduled (e.g., cron) jobs. Some implementations can include "advanced scheduling" (e.g., auto-start/stop/restart, time-based repeat, etc.) within the controller.

The GUI/host workstation can include a user console 218 and a user query application 220. The user console 218 can be configured to connect to the persistent query controller 216. The user query application 220 can be configured to connect to one or more remote query dispatchers (e.g., 232) and one or more remote query processors (228, 230).

Figure 3:
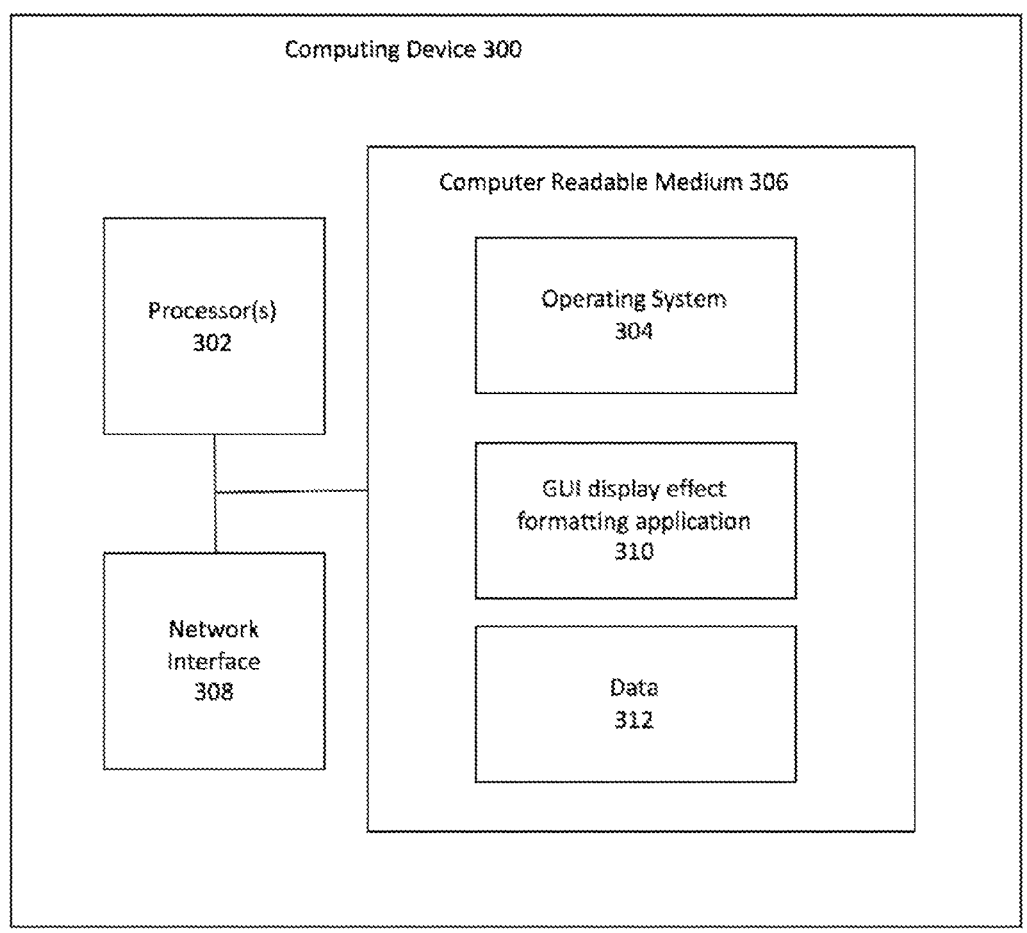
FIG. 3 is a diagram of an example computing device configured for GUI display effect format processing in accordance with some implementations.

FIG. 3 is a diagram of an example computing device 300 in accordance with at least one implementation. The computing device 300 includes one or more processors 302, operating system 304, computer readable medium 306 and network interface 308. The memory 306 can include a GUI display effect formatting application 310 and a data section 312 (e.g., for storing ASTs, precompiled code, etc.).

In operation, the processor 302 may execute the application 310 stored in the memory 306. The application 310 can include software instructions that, when executed by the processor, cause the processor to perform operations for executing and updating queries in accordance with the present disclosure (e.g., performing one or more of 602-614, 902-914 described below).

The application program 310 can operate in conjunction with the data section 312 and the operating system 304.

In general, some implementations can provide a system for determining GUI display effect for displaying data based on the content of the data to be displayed. The system described herein may determine whether a data row or cell should have a particular GUI display effect applied for that data row or cell when displayed if the data content satisfies certain criteria. For example, one criterion could be whether data content includes a value equal to, above, or below a certain threshold value or within or outside of a range of values. Another criterion could be how recently the data content has changed, how it has changed, or to what extent it has changed. The GUI display effect may be applied to data being displayed or to the background area of a cell, row, column, or area of the GUI containing the data content, for example. In other implementations, the GUI display effect can be applied to table columns or a combination of rows and columns.

It will be appreciated that thresholds and ranges are only exemplary methods for determining display effects. Arbitrary formulas within a data system can be used for computing GUI display effects. Additionally, other columns or rows than the column to be formatted can be used as input to the computation of GUI display effects.

The GUI display effect may use different colors, shading, brightness, flashing, motion, sizing, and/or other visual effect to call attention to or differentiate an area of a display, a browser page or data contained therein. While certain exemplary embodiments are described herein using different colors as a GUI display effect, it is understood that any GUI display effect may supplement or substitute for coloring as a GUI display effect.

The GUI display effect may be applied to a computer screen or monitor such as a CRT, projector, LCD, LED, e-ink display, or OLED screen, for example.

It will be appreciated that the GUI display effect can be applied to any computing device that contains a viewable screen, or projections, such as tablets, smart phones, glasses, heads-up-displays, or the like.

In some implementations, the data source can be a dynamic data source in which the data being displayed on a graphical user interface screen can change as the data source content changes. The system described herein can modify the applied GUI display effect according to dynamic changes to the underlying data used to determine and apply the initial GUI display effect.

FIG. 4 is a diagram of an example Graphical User Interface (GUI) display with an example hidden color GUI display effect column 400 in accordance with some implementations. The display 400 can display content before the application of a color GUI display effect produced by color formula for average prices less than $90 designated as red and for average prices greater than $100 designated as green 402. The content 402 displayed in the GUI display 400 can contain a table with columns for "SYMBOL", "MONTH", and "AVGPRICE." The GUI display can also contain a hidden column 404 that is hidden from being displayed on the GUI display. For example, the hidden column 404 can contain color GUI display effect rows for "AVGPRICE CELL COLOR." In the example, a processor can receive a format command to apply a red color GUI display effect when AvgPrice is less than $90 and to apply a green color GUI display effect when the AvgPrice is greater than $100. The color GUI display effect outcome of the format application can be stored in the hidden column 404. For example, the hidden column 404 format color GUI display effect for row (AAPL, JAN, $99.83) is NULL because $99.83 is greater than $90 but less than $100 and no color GUI display effect is provided for this range. In the row (AAPL, FEB, $101.96), the format color GUI display effect stored in the AVGPRICE CELL COLOR column is GREEN because the AVGPRICE for this row is greater than $100. In another example row (AAPL, JUN, $89.13), the format color GUI display effect stored in the AVGPRICE CELL COLOR column is RED because the AVGPRICE for this row is less than $90.

FIG. 4A is a diagram of an example GUI visible content with a cell color GUI display effect applied 450 in accordance with some implementations. For example, applying the color GUI display effect contained in the hidden column 404 from the example in FIG. 4, the green (452, 454, 460, 462, 464) color GUI display effect from hidden column 404 can be applied to the adjacent cells to the hidden column 404 in the GUI display 450. Continuing with the example, the red (456, 458) color GUI display effect from 404 can be applied to the adjacent cells to the hidden column 404 in the GUI display 450.

It will be appreciated that the example NULL color GUI display effect values from the hidden column 404 can have no effect on the corresponding cells in 450 and a default format can be rendered.

It will be appreciated that data sources can be static or dynamic. Dynamic data sources can have data added, modified, re-indexed, reordered, or deleted. For example, a dynamic table can have one or more rows added, one or more rows modified, or one or more rows deleted. If a dynamic table has one or more rows added, a GUI display effect will be added for those rows in the hidden column 404. If a dynamic table has one or more rows modified, the GUI display effect in the hidden column 404 for those rows can change if the data used to determine the GUI display effect is modified enough to move it beyond the existing GUI display effect threshold in the format command. As the dynamic table data is updated on the GUI display screen, the GUI display effect can also be updated on the GUI display screen.

Computer instructions for selecting a possible GUI display effect may be hidden. For example, in a database, the instructions may be in a hidden column or columns. The hidden column or columns may be unavailable to a viewer observing a display showing the GUI display effect on visible columns of the same data source. Alternatively, the hidden column may be available to a user taking a certain action to unhide the column. In that case, the instructions may be configurable by a user of the display. While embodiments are described herein as employing a hidden column, it is understood that multiple hidden columns may be used.

FIG. 5 is a diagram of an example GUI display with a hidden color column 500 in accordance with some implementations. The GUI display 500 can display content before the application of a color GUI display effect produced by color formula for average prices less than $90 designated as red and for average prices greater than $100 designated as green 502. The content 502 displayed in the GUI display 500 can contain a table with columns for "SYMBOL", "MONTH", and "AVGPRICE." The GUI display can also contain one or more hidden columns 504 that is hidden from being displayed on the GUI display. For example, the hidden column 504 can contain color GUI display effect rows for "AVGPRICE ROW COLOR." In the example, a processor can receive a format command to apply a red color GUI display effect when AvgPrice is less than $90 and to apply a green color GUI display effect when the AvgPrice is greater than $100. The color GUI display effect outcome of the format application can be stored in the hidden column 504. For example, the hidden column 504 format color GUI display effect for row (AAPL, JAN, $99.83) is NULL because $99.83 is greater than $90 but less than $100 and no color GUI display effect is provided for this range. In the row (AAPL, FEB, $101.96), the format color GUI display effect stored in the AVGPRICE ROW COLOR column is GREEN because the AVGPRICE for this row is greater than $100. In another example row (AAPL, JUN, $89.13), the format color GUI display effect stored in the AVGPRICE ROW COLOR column is RED because the AVGPRICE for this row is less than $90.

FIG. 5A is a diagram of an example GUI with visible content with a row color GUI display effect applied 550 in accordance with some implementations. For example, applying the color GUI display effect contained in the hidden column 504 from the example in FIG. 5, the green (552, 554, 560, 562, 564) color GUI display effect from hidden column 504 can be applied to the corresponding rows in 550. Continuing with the example, the red (556, 558) color GUI display effect from 504 can be applied to the adjacent rows in 550.

It will be appreciated that the example NULL color GUI display effect values from the hidden column 504 can use the default formatting on the corresponding rows in 550.

It will be appreciated that data sources can be static or dynamic. Dynamic data sources can have data added, modified, re-indexed, reordered, or deleted. For example, a dynamic table can have one or more rows added, one or more rows modified, or one or more rows deleted. If a dynamic table has one or more rows added, a GUI display effect will be added for those rows in the hidden column 504. If a dynamic table has one or more rows modified, the color GUI display effect in the hidden column 504 for those rows can change if the data used to determine the color GUI display effect is modified enough to move it beyond the existing color GUI display effect threshold in the format command. As the dynamic table data is updated on the GUI display screen, the GUI display effect can also be updated on the GUI display screen.

Figure 6:
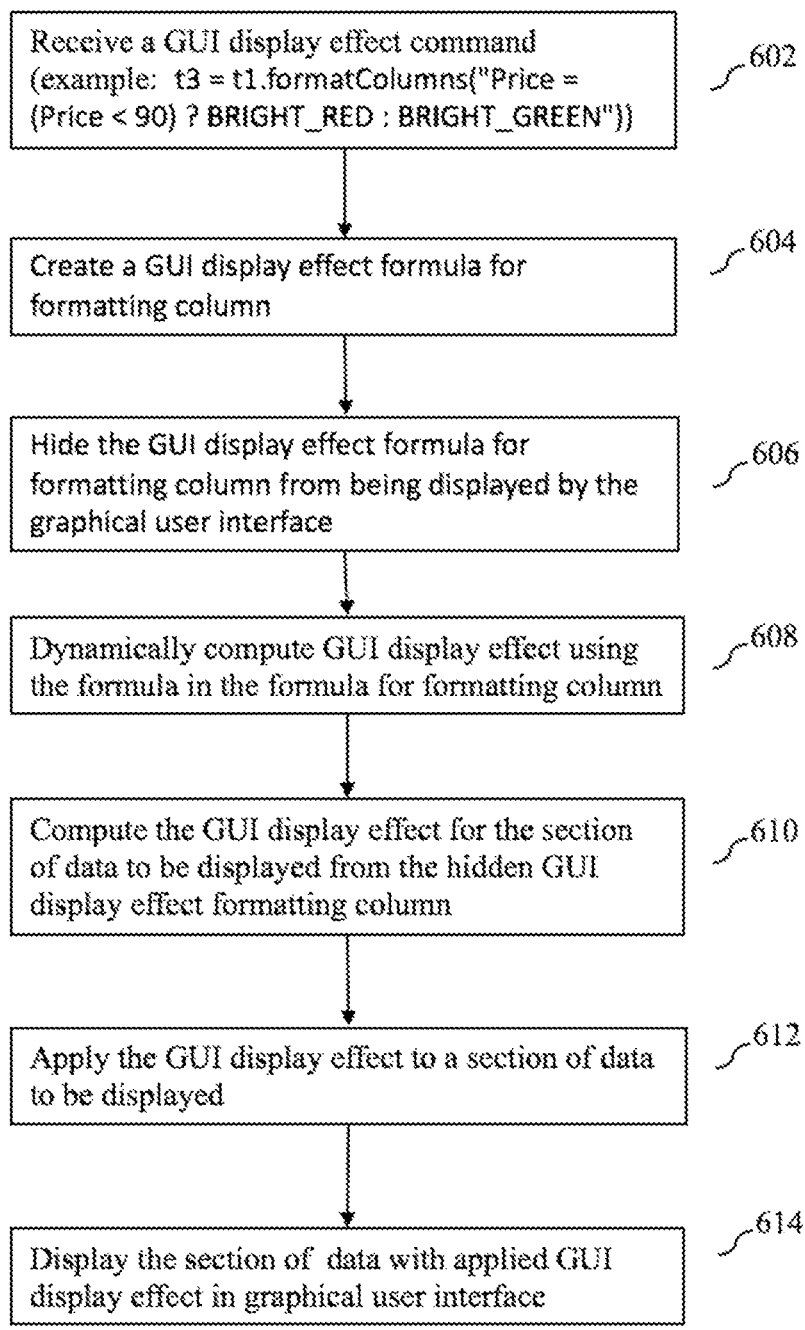
FIG. 6 is a diagram of an example flow chart for determining and displaying a GUI display effect in accordance with some implementations.

FIG. 6 is a diagram of an example flow chart for determining and displaying a GUI display effect in accordance with some implementations. Processing begins at 602, when the system receives a format command, for example, t3=t1.formatColumns("Price=(Price<90) ? BRIGHT_RED: BRIGHT_GREEN")) to color format cells in the Price column bright red if Price is less than 90 and bright green for Price column cells greater than or equal to 90.

It will be appreciated the GUI display effect is not limited to coloring. The GUI display effect may use different colors, shading, brightness, flashing, motion, sizing, and/or other visual effect to call attention to or differentiate an area of a display, a browser page or data contained therein. While certain exemplary embodiments are described herein using different colors as a GUI display effect, it is understood that any GUI display effect may supplement or substitute for coloring as a GUI display effect. Processing continues to 604.

At 604, a GUI display effect formula for a formatting column is created. Processing continues to 606.

At 606, the GUI display effect formula for a formatting column is hidden from being displayed by the graphical user interface. Processing continues to 608.

At 608, the GUI display effect is dynamically computed using the formula in the formula for formatting column. Processing continues to 610.

At 610, the GUI display effect for the section of data to be displayed is computed from the hidden GUI display effect formatting column. Processing continues to 612.

At 612, the GUI display effect is applied to a section of data to be displayed. Processing continues to 614.

At 614, the section of data with the applied GUI display effect is displayed in a graphical user interface.

FIG. 7 is a diagram of an example Graphical User Interface (GUI) display with an example hidden font GUI display effect column 700 in accordance with some implementations. The display 700 can display content before the application of a font GUI display effect produced by font formula for average prices greater than $100 designated as being in italics 702. The content 702 displayed in the GUI display 700 can contain a table with columns for "SYMBOL", "MONTH", and "AVGPRICE." The GUI display can also contain a hidden column 704 that is hidden from being displayed on the GUI display. For example, the hidden column 704 can contain font GUI display effect rows for "AVGPRICE CELL FONT." In the example, a processor can receive a format command to apply a font GUI display effect when AvgPrice is greater than $100. The font GUI display effect outcome of the format application can be stored in the hidden column 704. For example, the hidden column 704 format font GUI display effect for row (AAPL, JAN, $99.83) is NULL because $99.83 is less than $100 and no font GUI display effect is provided for this range. In the row (AAPL, FEB, $101.96), the format font GUI display effect stored in the AVGPRICE CELL FONT column is ITALICS because the AVGPRICE for this row is greater than $100.

FIG. 7A is a diagram of an example GUI visible content with a cell font GUI display effect applied 450 in accordance with some implementations. For example, applying the font GUI display effect contained in the hidden column 704 from the example in FIG. 7, the font GUI display effect from hidden column 704 can be applied to the adjacent cells to the hidden column 704 in the GUI display 750.

It will be appreciated that the example NULL font GUI display effect values from the hidden column 704 can have no effect on the corresponding cells in 750 and a default format can be rendered.

It will be appreciated that data sources can be static or dynamic. Dynamic data sources can have data added, modified, re-indexed, reordered, or deleted. For example, a dynamic table can have one or more rows added, one or more rows modified, or one or more rows deleted. If a dynamic table has one or more rows added, a GUI display effect will be added for those rows in the hidden column 704. If a dynamic table has one or more rows modified, the GUI display effect in the hidden column 704 for those rows can change if the data used to determine the GUI display effect is modified enough to move it beyond the existing GUI display effect threshold in the format command. As the dynamic table data is updated on the GUI display screen, the GUI display effect can also be updated on the GUI display screen.

Computer instructions for selecting a possible GUI display effect may be hidden. For example, in a database, the instructions may be in a hidden column or columns. The hidden column or columns may be unavailable to a viewer observing a display showing the GUI display effect on visible columns of the same data source. Alternatively, the hidden column may be available to a user taking a certain action to unhide the column. In that case, the instructions may be configurable by a user of the display. While embodiments are described herein as employing a hidden column, it is understood that multiple hidden columns may be used.

FIG. 8 is a diagram of an example GUI display with a hidden font column 800 in accordance with some implementations. The GUI display 800 can display content before the application of a font GUI display effect produced by font formula for average prices greater than $100 designated as requiring italics. The content 802 displayed in the GUI display 800 can contain a table with columns for "SYMBOL", "MONTH", and "AVGPRICE." The GUI display can also contain one or more hidden columns 804 that is hidden from being displayed on the GUI display. For example, the hidden column 804 can contain font GUI display effect rows for "AVGPRICE ROW FONT." In the example, a processor can receive a format command to apply an italics font GUI display effect when AvgPrice is greater than $100. The font GUI display effect outcome of the format application can be stored in the hidden column 804. For example, the hidden column 804 format font GUI display effect for row (AAPL, JAN, $99.83) is NULL because $99.83 is less than $100 and no font GUI display effect is provided for this value. In the row (AAPL, FEB, $101.96), the format font GUI display effect stored in the AVGPRICE ROW FONT column is italics because the AVGPRICE for this row is greater than $100.

FIG. 8A is a diagram of an example GUI with visible content with a row font GUI display effect applied 850 in accordance with some implementations. For example, applying the font GUI display effect contained in the hidden column 804 from the example in FIG. 8, the font GUI display effect from hidden column 804 can be applied to the corresponding rows in 850.

It will be appreciated that the example NULL font GUI display effect values from the hidden column 804 can use the default formatting on the corresponding rows in 850.

It will be appreciated that data sources can be static or dynamic. Dynamic data sources can have data added, modified, re-indexed, reordered, or deleted. For example, a dynamic table can have one or more rows added, one or more rows modified, or one or more rows deleted. If a dynamic table has one or more rows added, a GUI display effect will be added for those rows in the hidden column 804. If a dynamic table has one or more rows modified, the font GUI display effect in the hidden column 804 for those rows can change if the data used to determine the font GUI display effect is modified enough to move it beyond the existing font GUI display effect threshold in the format command. As the dynamic table data is updated on the GUI display screen, the GUI display effect can also be updated on the GUI display screen.

Figure 9:
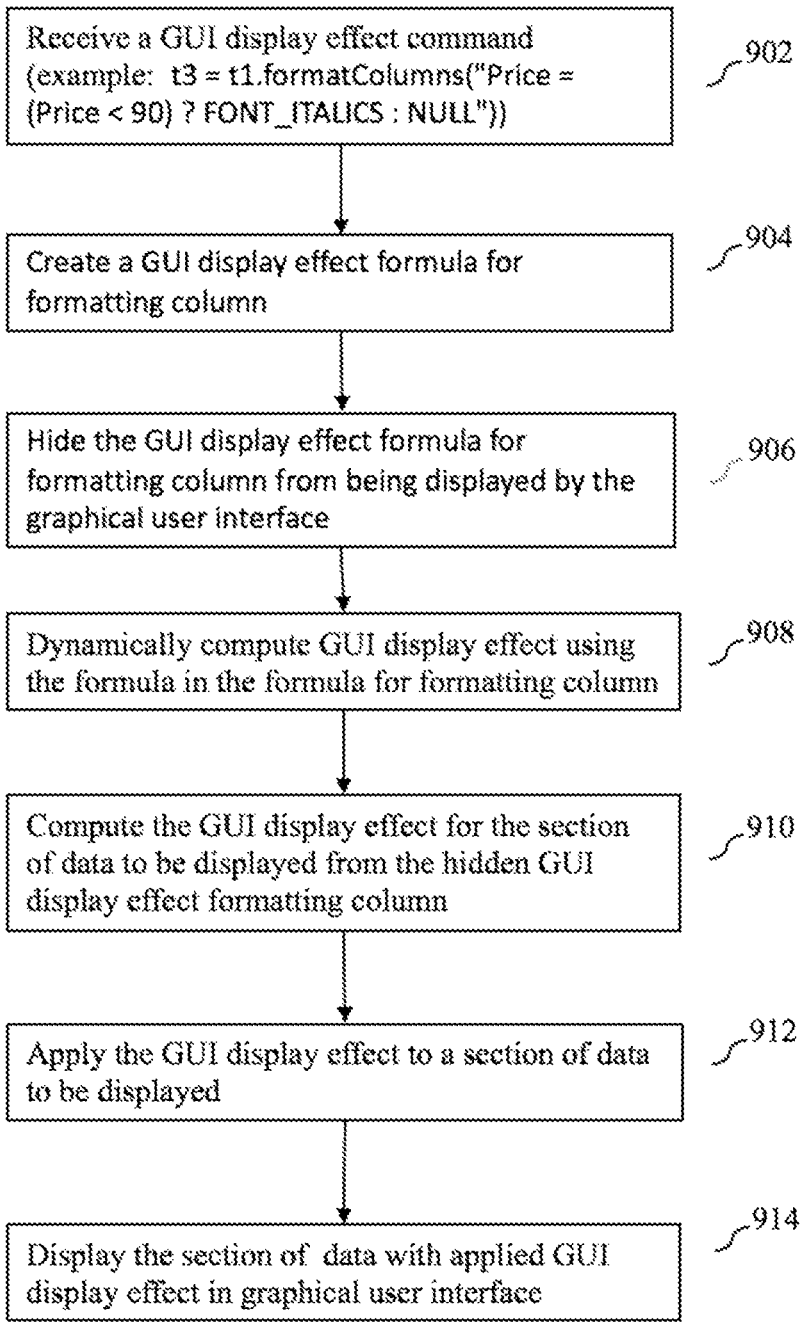
FIG. 9 is a diagram of an example flow chart for determining and displaying a GUI display effect in accordance with some implementations.

FIG. 9 is a diagram of an example flow chart for determining and displaying a GUI display effect in accordance with some implementations. Processing begins at 902, when the system receives a format command, for example, t3=t1.formatColumns("Price=(Price>100) ? ITALICS: NULL")) to font format cells in the Price column in italics if Price is greater than 100.

It will be appreciated the GUI display effect is not limited to fonts. The GUI display effect may use different colors, shading, brightness, flashing, motion, sizing, and/or other visual effect to call attention to or differentiate an area of a display, a browser page or data contained therein. While certain exemplary embodiments are described herein using italics as a GUI display effect, it is understood that any GUI display effect may supplement or substitute for italics as a GUI display effect. Processing continues to 904.

At 904, a GUI display effect formula for a formatting column is created. Processing continues to 906.

At 906, the GUI display effect formula for a formatting column is hidden from being displayed by the graphical user interface. Processing continues to 908.

At 908, the GUI display effect is dynamically computed using the formula in the formula for formatting column.

It will be appreciated that GUI display effects can be pre-computed before determining that a region of a table is displayed. Processing continues to 910.

At 910, the GUI display effect for the section of data to be displayed is computed from the hidden GUI display effect formatting column. Processing continues to 912.

At 912, the GUI display effect is applied to a section of data to be displayed. Processing continues to 914.

At 914, the section of data with the applied GUI display effect is displayed in a graphical user interface.

It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC), a field programmable gate array (FPGA), or graphics processing unit (GPU), or the like. The instructions can be compiled from source code instructions provided in accordance with a programming language such as Java, C, C++, C#.net, assembly or the like. The instructions can also comprise code and data objects provided in accordance with, for example, the Visual Basic™ language, a specialized database query language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their subcomponents or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general purpose computer, a special purpose computer, a microprocessor, or the like.

It is, therefore, apparent that there is provided, in accordance with the various embodiments disclosed herein, methods, systems and computer readable media for GUI display effect formatting.

Application Ser. No. 15/154,974, entitled "DATA PARTITIONING AND ORDERING" and filed in the United States Patent and Trademark Office on May 14, 2016, is hereby incorporated by reference herein in its entirety as if fully set forth herein.

Application Ser. No. 15/154,975, entitled "COMPUTER DATA SYSTEM DATA SOURCE REFRESHING USING AN UPDATE PROPAGATION GRAPH" and filed in the United States Patent and Trademark Office on May 14, 2016, is hereby incorporated by reference herein in its entirety as if fully set forth herein.

Application Ser. No. 15/154,979, entitled "COMPUTER DATA SYSTEM POSITION-INDEX MAPPING" and filed in the United States Patent and Trademark Office on May 14, 2016, is hereby incorporated by reference herein in its entirety as if fully set forth herein.

Application Ser. No. 15/154,980, entitled "SYSTEM PERFORMANCE LOGGING OF COMPLEX REMOTE QUERY PROCESSOR QUERY OPERATIONS" and filed in the United States Patent and Trademark Office on May 14, 2016, is hereby incorporated by reference herein in its entirety as if fully set forth herein.

Application Ser. No. 15/154,983, entitled "DISTRIBUTED AND OPTIMIZED GARBAGE COLLECTION OF REMOTE AND EXPORTED TABLE HANDLE LINKS TO UPDATE PROPAGATION GRAPH NODES" and filed in the United States Patent and Trademark Office on May 14, 2016, is hereby incorporated by reference herein in its entirety as if fully set forth herein.

Application Ser. No. 15/154,984, entitled "COMPUTER DATA SYSTEM CURRENT ROW POSITION QUERY LANGUAGE CONSTRUCT AND ARRAY PROCESSING QUERY LANGUAGE CONSTRUCTS" and filed in the United States Patent and Trademark Office on May 14, 2016, is hereby incorporated by reference herein in its entirety as if fully set forth herein.

Application Ser. No. 15/154,985, entitled "PARSING AND COMPILING DATA SYSTEM QUERIES" and filed in the United States Patent and Trademark Office on May 14, 2016, is hereby incorporated by reference herein in its entirety as if fully set forth herein.

Application Ser. No. 15/154,987, entitled "DYNAMIC FILTER PROCESSING" and filed in the United States Patent and Trademark Office on May 14, 2016, is hereby incorporated by reference herein in its entirety as if fully set forth herein.

Application Ser. No. 15/154,988, entitled "DYNAMIC JOIN PROCESSING USING REAL-TIME MERGED NOTIFICATION LISTENER" and filed in the United States Patent and Trademark Office on May 14, 2016, is hereby incorporated by reference herein in its entirety as if fully set forth herein.

Application Ser. No. 15/154,990, entitled "DYNAMIC TABLE INDEX MAPPING" and filed in the United States Patent and Trademark Office on May 14, 2016, is hereby incorporated by reference herein in its entirety as if fully set forth herein.

Application Ser. No. 15/154,991, entitled "QUERY TASK PROCESSING BASED ON MEMORY ALLOCATION AND PERFORMANCE CRITERIA" and filed in the United States Patent and Trademark Office on May 14, 2016, is hereby incorporated by reference herein in its entirety as if fully set forth herein.

Application Ser. No. 15/154,993, entitled "A MEMORY-EFFICIENT COMPUTER SYSTEM FOR DYNAMIC UPDATING OF JOIN PROCESSING" and filed in the United States Patent and Trademark Office on May 14, 2016, is hereby incorporated by reference herein in its entirety as if fully set forth herein.

Application Ser. No. 15/154,995, entitled "QUERY DISPATCH AND EXECUTION ARCHITECTURE" and filed in the United States Patent and Trademark Office on May 14, 2016, is hereby incorporated by reference herein in its entirety as if fully set forth herein.

Application Ser. No. 15/154,996, entitled "COMPUTER DATA DISTRIBUTION ARCHITECTURE" and filed in the United States Patent and Trademark Office on May 14, 2016, is hereby incorporated by reference herein in its entirety as if fully set forth herein.

Application Ser. No. 15/154,997, entitled "DYNAMIC UPDATING OF QUERY RESULT DISPLAYS" and filed in the United States Patent and Trademark Office on May 14, 2016, is hereby incorporated by reference herein in its entirety as if fully set forth herein.

Application Ser. No. 15/154,998, entitled "DYNAMIC CODE LOADING" and filed in the United States Patent and Trademark Office on May 14, 2016, is hereby incorporated by reference herein in its entirety as if fully set forth herein.

Application Ser. No. 15/154,999, entitled "IMPORTATION, PRESENTATION, AND PERSISTENT STORAGE OF DATA" and filed in the United States Patent and Trademark Office on May 14, 2016, is hereby incorporated by reference herein in its entirety as if fully set forth herein.

Application Ser. No. 15/155,001, entitled "COMPUTER DATA DISTRIBUTION ARCHITECTURE" and filed in the United States Patent and Trademark Office on May 14, 2016, is hereby incorporated by reference herein in its entirety as if fully set forth herein.

Application Ser. No. 15/155,005, entitled "PERSISTENT QUERY DISPATCH AND EXECUTION ARCHITECTURE" and filed in the United States Patent and Trademark Office on May 14, 2016, is hereby incorporated by reference herein in its entirety as if fully set forth herein.

Application Ser. No. 15/155,006, entitled "SINGLE INPUT GRAPHICAL USER INTERFACE CONTROL ELEMENT AND METHOD" and filed in the United States Patent and Trademark Office on May 14, 2016, is hereby incorporated by reference herein in its entirety as if fully set forth herein.

Application Ser. No. 15/155,007, entitled "GRAPHICAL USER INTERFACE DISPLAY EFFECTS FOR A COMPUTER DISPLAY SCREEN" and filed in the United States Patent and Trademark Office on May 14, 2016, is hereby incorporated by reference herein in its entirety as if fully set forth herein.

Application Ser. No. 15/155,009, entitled "COMPUTER ASSISTED COMPLETION OF HYPERLINK COMMAND SEGMENTS" and filed in the United States Patent and Trademark Office on May 14, 2016, is hereby incorporated by reference herein in its entirety as if fully set forth herein.

Application Ser. No. 15/155,010, entitled "HISTORICAL DATA REPLAY UTILIZING A COMPUTER SYSTEM" and filed in the United States Patent and Trademark Office on May 14, 2016, is hereby incorporated by reference herein in its entirety as if fully set forth herein.

Application Ser. No. 15/155,011, entitled "DATA STORE ACCESS PERMISSION SYSTEM WITH INTERLEAVED APPLICATION OF DEFERRED ACCESS CONTROL FILTERS" and filed in the United States Patent and Trademark Office on May 14, 2016, is hereby incorporated by reference herein in its entirety as if fully set forth herein.

Application Ser. No. 15/155,012, entitled "REMOTE DATA OBJECT PUBLISHING/SUBSCRIBING SYSTEM HAVING A MULTICAST KEY-VALUE PROTOCOL" and filed in the United States Patent and Trademark Office on May 14, 2016, is hereby incorporated by reference herein in its entirety as if fully set forth herein.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter.

What is claimed is:

1. A system for formatting data for display on a computer display screen, the system comprising:
   one or more hardware processors;
   a computer display screen configured to display data via a graphical user interface (GUI);
   a computer readable data storage device coupled to the one or more hardware processors, the computer readable data storage device having stored thereon software instructions that, when executed by the one or more hardware processors, cause the one or more hardware processors to perform operations including:
   creating a GUI display effect formula for a formatting column;
   hiding the formatting column from being displayed by the graphical user interface on the computer display screen;
   dynamically computing a GUI display effect using the GUI display effect formula for a formatting column;
   choosing a section of data to be displayed on the computer display screen via the graphical user interface;
   computing the GUI display effect for the section of data to be displayed on the computer display screen via the graphical interface using the hidden formatting column;
   applying the computed GUI display effect to the section of data to be displayed;
   displaying on the computer display screen the section of data with the applied computed GUI display effect.

2. The system of claim 1, wherein the operations further comprise applying the GUI display effect formatting by applying a formula to associated data in a same row of data.

3. The system of claim 1, wherein applying the GUI display effect formatting includes applying a GUI display effect to at least one of an entire row of data, an entire column of data, an entire table, a tab, a browser, and a graphical user interface.

4. The system of claim 1, wherein the section of data to be displayed on the graphical interface using the hidden formatting column is determined by scrolling.

5. The system of claim 1, wherein the operations further comprise:
   receiving updates to the section of data to be displayed on the graphical user interface;
   using a processor, dynamically computing a GUI display effect for the updates to the section of data using the GUI display effect formula for a formatting column;
   choosing a section of data to be displayed on the graphical user interface;

computing the GUI display effect for the section of data to be displayed on the graphical interface using the hidden formatting column;

applying the computed GUI display effect to the section of data to be displayed;

displaying the section of data with the applied computed GUI display effect.

6. The system of claim 1, wherein computing the GUI display effect occurs prior to displaying the section of data.

7. The system of claim 1, wherein computing the GUI display effect occurs at the time of displaying the section of data.

8. A method for formatting data displayed in a graphical user interface (GUI), the method comprising:

creating a GUI display effect formula for a formatting column;

hiding the formatting column from being displayed by the graphical user interface;

using a processor, dynamically computing a GUI display effect using the GUI display effect formula for a formatting column;

choosing a section of data to be displayed on the graphical user interface;

computing the GUI display effect for the section of data to be displayed on the graphical interface using the hidden formatting column;

applying the computed GUI display effect to the section of data to be displayed;

displaying the section of data with the applied computed GUI display effect.

9. The method of claim 8, further comprising applying the GUI display effect formatting by applying a formula to associated data in a same row of data.

10. The method of claim 8, wherein applying the GUI display effect formatting includes applying a GUI display effect to at least one of an entire row of data, an entire column of data, an entire table, a tab, a browser, and a graphical user interface.

11. The method of claim 8, wherein the section of data to be displayed on the graphical interface using the hidden formatting column is determined by scrolling.

12. The method of claim 8, further comprising:

receiving updates to the section of data to be displayed on the graphical user interface;

using a processor, dynamically computing a GUI display effect for the updates to the section of data using the GUI display effect formula for a formatting column;

choosing a section of data to be displayed on the graphical user interface;

computing the GUI display effect for the section of data to be displayed on the graphical interface using the hidden formatting column;

applying the computed GUI display effect to the section of data to be displayed;

displaying the section of data with the applied computed GUI display effect.

13. The method of claim 8, wherein computing the GUI display effect occurs prior to displaying the section of data.

14. A nontransitory computer readable medium having stored thereon software instructions that, when executed by one or more processors, cause the one or more processors to perform operations including:

creating a GUI display effect formula for a formatting column;

hiding the formatting column from being displayed by the graphical user interface on the computer display screen;

dynamically computing a GUI display effect using the GUI display effect formula for a formatting column;

choosing a section of data to be displayed on the computer display screen via the graphical user interface;

computing the GUI display effect for the section of data to be displayed on the computer display screen via the graphical interface using the hidden formatting column;

applying the computed GUI display effect to the section of data to be displayed;

displaying on the computer display screen the section of data with the applied computed GUI display effect.

15. The nontransitory computer readable medium of claim 14, wherein the operations further comprise applying the GUI display effect formatting by applying a formula to associated data in a same row of data.

16. The nontransitory computer readable medium of claim 14, wherein applying the GUI display effect formatting includes applying a GUI display effect to at least one of an entire row of data, an entire column of data, an entire table, a tab, a browser, and a graphical user interface.

17. The nontransitory computer readable medium of claim 14, wherein the section of data to be displayed on the graphical interface using the hidden formatting column is determined by scrolling.

18. The nontransitory computer readable medium of claim 14, wherein the operations further comprise:

receiving updates to the section of data to be displayed on the graphical user interface;

using a processor, dynamically computing a GUI display effect for the updates to the section of data using the GUI display effect formula for a formatting column;

choosing a section of data to be displayed on the graphical user interface;

computing the GUI display effect for the section of data to be displayed on the graphical interface using the hidden formatting column;

applying the computed GUI display effect to the section of data to be displayed;

displaying the section of data with the applied computed GUI display effect.

19. The nontransitory computer readable medium of claim 14, wherein computing the GUI display effect occurs prior to displaying the section of data.

20. The nontransitory computer readable medium of claim 14, wherein computing the GUI display effect occurs at the time of displaying the section of data.

\* \* \* \* \*